United States Patent
Amemiya et al.

(10) Patent No.: US 7,297,955 B2
(45) Date of Patent: Nov. 20, 2007

(54) SEMICONDUCTOR RADIATION DETECTOR, POSITRON EMISSION TOMOGRAPHY APPARATUS, SEMICONDUCTOR RADIATION DETECTION APPARATUS, DETECTOR UNIT AND NUCLEAR MEDICINE DIAGNOSTIC APPARATUS

(75) Inventors: Kensuke Amemiya, Hitachinaka (JP); Yuuichirou Ueno, Hitachi (JP); Hiroshi Kitaguchi, Naka (JP); Osamu Yokomizo, Tokai (JP); Shinichi Kojima, Hitachi (JP); Katsutoshi Tsuchiya, Hitachi (JP); Norihito Yanagita, Hitachi (JP); Kazuma Yokoi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/874,343

(22) Filed: Jun. 24, 2004

(65) Prior Publication Data

US 2005/0067572 A1    Mar. 31, 2005

(30) Foreign Application Priority Data

Sep. 30, 2003    (JP) .............................. 2003-340688

(51) Int. Cl.
*G01T 1/166*    (2006.01)
(52) U.S. Cl. ........................... 250/363.05; 250/363.04; 250/370.01; 250/370.09
(58) Field of Classification Search ........... 250/363.05, 250/363.04, 370.01, 370.09
See application file for complete search history.

(56) References Cited

U.S. PATENT DOCUMENTS 4,700,076 A    10/1987  Dorman et al.
4,794,257 A    12/1988  Baba et al.

(Continued)

FOREIGN PATENT DOCUMENTS

EP    0 734 076 A2    9/1996

(Continued)

*Primary Examiner*—David Porta
*Assistant Examiner*—Shun Lee
(74) *Attorney, Agent, or Firm*—Dickstein Shapiro LLP

(57) ABSTRACT

Each semiconductor radiation detector used for a nuclear medicine diagnostic apparatus (PET apparatus) is constructed with an anode electrode A facing a cathode electrode C sandwiching a CdTe semiconductor member S which generates charge through interaction with γ-rays. Then, a thickness t of the semiconductor member S sandwiched between these mutually facing anode electrode A and cathode electrode C is set to 0.2 to 2 mm. Furthermore, the devices are mounted (laid out) on substrates in such a way that the distance (distance of conductor) between the semiconductor radiation detector and an analog ASIC which processes the signal detected by this detector is shortened. Furthermore, the substrates on which the detectors are mounted are housed in a housing as a unit (detector unit).

17 Claims, 12 Drawing Sheets

U.S. PATENT DOCUMENTS

| | | | |
|---|---|---|---|
| 4,868,393 A | 9/1989 | Kiri et al. | |
| 5,316,831 A * | 5/1994 | Nakajima et al. | 428/209 |
| 5,684,850 A * | 11/1997 | Warburton et al. | 378/53 |
| 5,693,948 A | 12/1997 | Sayed et al. | |
| 5,742,060 A | 4/1998 | Ashburn | |
| 5,821,540 A | 10/1998 | Sato et al. | |
| 5,907,156 A | 5/1999 | Nishizawa et al. | |
| 6,236,051 B1 | 5/2001 | Yamakawa et al. | |
| 6,346,706 B1 * | 2/2002 | Rogers et al. | 250/363.04 |
| 6,403,964 B1 * | 6/2002 | Kyyhkynen | 250/370.09 |
| 6,541,773 B1 | 4/2003 | Iwabuchi et al. | |
| 6,590,215 B2 * | 7/2003 | Nygard et al. | 250/370.09 |
| 6,621,084 B1 | 9/2003 | Wainer et al. | |
| 6,658,082 B2 * | 12/2003 | Okumura et al. | 378/19 |
| 6,703,617 B1 | 3/2004 | Spartiotis et al. | |
| 2003/0030721 A1 | 2/2003 | Nyholm | |
| 2003/0108147 A1 | 6/2003 | Kojima et al. | |

FOREIGN PATENT DOCUMENTS

| | | |
|---|---|---|
| EP | 1 271 181 A2 | 1/2003 |
| JP | 60-86481 | 5/1985 |
| JP | 4-203997 | 7/1992 |
| JP | 5-333157 | 12/1993 |
| JP | 7-29489 | 6/1995 |
| JP | 9-275223 | 10/1997 |
| JP | 63-49140 | 3/1998 |
| JP | 11-344573 | 12/1999 |
| JP | 2000-131440 | 5/2000 |
| JP | 2003-79614 | 3/2003 |
| JP | 2003-167058 | 6/2003 |

* cited by examiner

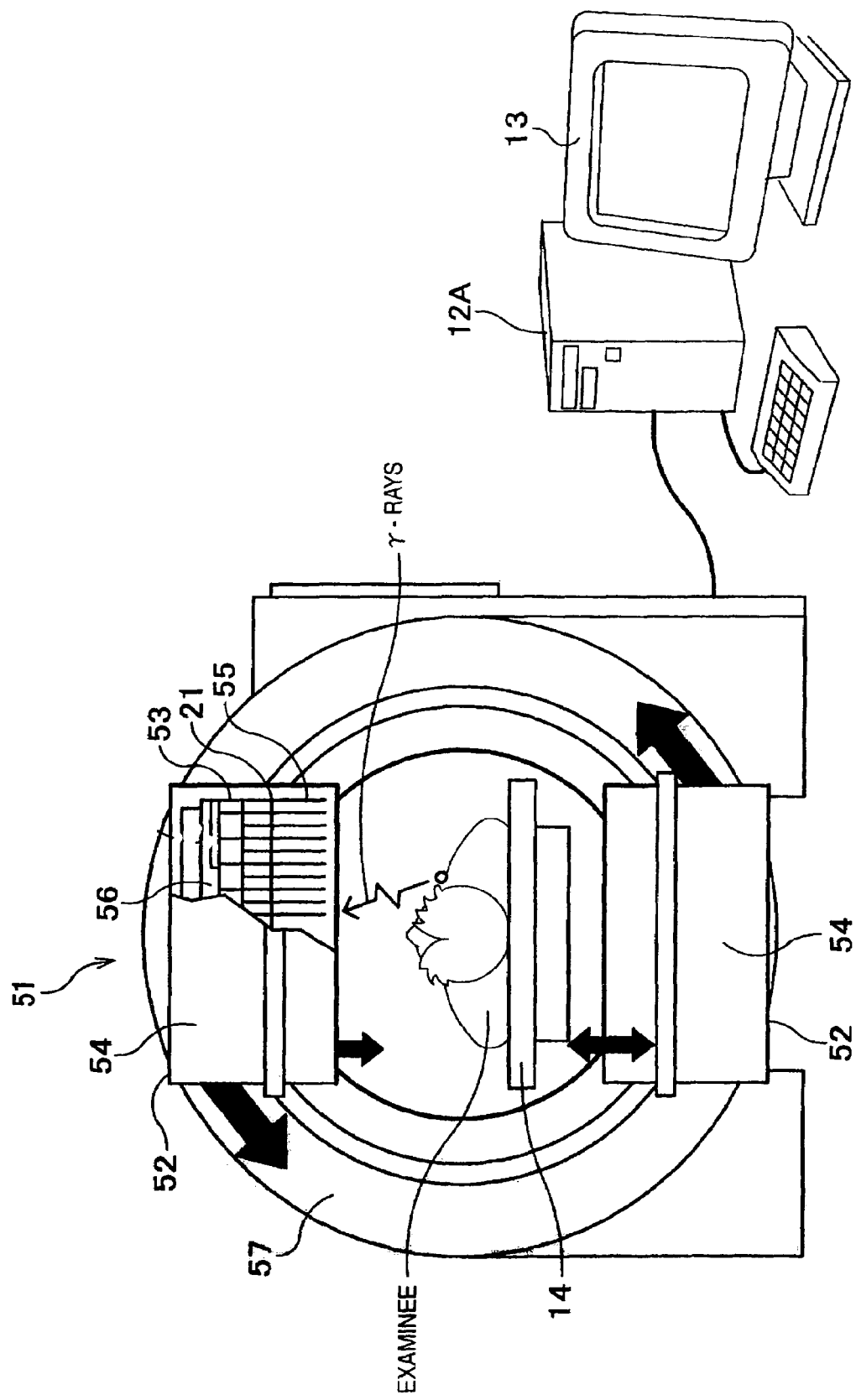

SEMICONDUCTOR RADIATION DETECTOR, POSITRON EMISSION TOMOGRAPHY APPARATUS, SEMICONDUCTOR RADIATION DETECTION APPARATUS, DETECTOR UNIT AND NUCLEAR MEDICINE DIAGNOSTIC APPARATUS

CROSS-REFERENCE TO RELATED APPLICATION

The present application is related to U.S. application Ser. No. 10/874,359, filed on Jun. 24, 2004 and being based on Japanese Patent Application No. 2003-340688, filed on Sep. 30, 2003, the entire contents of which are incorporated herein by reference.

BACKGROUND OF THE INVENTION

The present invention relates to a nuclear medicine diagnostic apparatus, and more particularly, to a positron emission tomography (hereinafter referred to as "PET") apparatus, which is a kind of a nuclear medicine diagnostic apparatus using a semiconductor radiation detector, semiconductor radiation detection apparatus or detector unit.

A detector using a NaI scintillator is known as a conventional radiation detector for detecting radiation such as γ-rays. With a gamma camera (a kind of nuclear medicine diagnostic apparatus) provided with a NaI scintillator, radiation (γ-rays) incident on the scintillator at an angle restricted by many collimators interacts with NaI crystals and emits scintillation light. This light travels in such a way as to sandwich a light guide, reaches a photoelectric multiplier and becomes an electrical signal. The electrical signal is shaped by a measuring circuit mounted on a measuring circuit fixing board and transferred from an output connector to an external data collection system. All these scintillator, light guide, photoelectric multiplier and measuring circuit, measuring circuit fixing board, etc., are housed in a light shielding case and shielded from electromagnetic waves other than external radiation.

Since a gamma camera using a scintillator has a structure with a large photoelectric multiplier (also called "photomultiplier") placed after one large crystal such as NaI, its position resolution remains on the order of 10 mm. Furthermore, since the scintillator detects radiation in multi-stages of conversion from radiation to visible light, from visible light to electrons, it has a problem of having considerably poor energy resolution. For example, there is a PET apparatus (positron emission tomography apparatus) having position resolution of 5 to 6 mm or a high-end PET apparatus having position resolution of 4 mm or so, but since their photoelectric multipliers use vacuum tubes, it is difficult to further improve position resolution.

There are radiation detectors for detecting radiation according to principles different from those of such a scintillator, such as semiconductor radiation detectors provided with a semiconductor radiation detection element using a semiconductor material such as CdTe (cadmium telluride), TlBr (thallium bromide) and GaAs (gallium arsenide).

This semiconductor radiation detector is attracting attention because its semiconductor radiation detection element converts electrical charge produced by interaction between radiation and the semiconductor material to an electrical signal, and therefore it has better efficiency of conversion to an electrical signal than the scintillator and can also be miniaturized.

[Patent Document 1] JP-A-2003-79614 (paragraph No. 0016)

[Patent Document 2] JP-A-2003-167058 (paragraph No. 0020, 0023)

Meanwhile, when a semiconductor material such as Tl making up a semiconductor radiation detection element interacts with radiation in a semiconductor radiation detector, holes having positive electrical charge and electrons having negative electrical charge are generated. While mobility of electrons is relatively large, mobility of holes is relatively small. That is, electrons move relatively easily and holes move with difficulty. This takes more time for holes to reach an electrode than electrons. Moreover, holes may be annihilated before reaching the electrode. This involves a problem that the detection sensitivity of radiation is worsened. Thus, these problems require solutions.

It is an object of the present invention to provide a semiconductor radiation detector capable of improving detection sensitivity.

SUMMARY OF THE INVENTION

In order to solve the above described problems, a first embodiment of the present invention improves detection sensitivity by shortening a distance between electrodes for charge collection of a semiconductor radiation detector. That is, the distance between an anode electrode and cathode electrode or the thickness of a semiconductor area sandwiched between the anode electrode and cathode electrode is 0.2 to 2 mm. In this structure, the distance from positions of electrons and holes generated by interaction between the semiconductor material and radiation to the electrodes is shortened, and therefore the time required for them to reach the electrodes is shortened. Furthermore, shortening the distance up to the electrodes reduces the probability that holes may be annihilated midway the distance.

A second embodiment of the present invention is a nuclear medicine diagnostic apparatus comprising a plurality of unit substrates including a plurality of semiconductor radiation detectors for introducing radiation and an integrated circuit for processing radiation detection signals output from the plurality of semiconductor radiation detectors. This allows the semiconductor radiation detectors and the integrated circuits which process the outputs to be disposed close to one another, with the result that when weak output signals of the semiconductor radiation detectors are transmitted to the integrated circuits, it is possible to reduce influences of noise on the weak output signals.

The semiconductor radiation detector, analog LSI (Large Scale Integrated Circuit), AD converter and digital LSI are preferably arranged on the unit substrate in that order and the respective elements are connected by wiring so that a signal detected by the semiconductor radiation detector is processed by the analog LSI, the signal processed by the analog LSI is processed by the AD converter, and the signal processed by the AD converter is processed by the digital LSI. By shortening the distance between the semiconductor radiation detector and analog LSI in particular, this structure can shorten the wiring distance between the semiconductor radiation detector and analog LSI and thereby reduce noise superimposed on the wiring until the signal detected by the semiconductor radiation detector reaches the analog LSI. In an embodiment which will be described later, the LSI (integrated circuit) corresponds to an ASIC. Also, the semiconductor radiation detection apparatus corresponds to a combined substrate (detector substrate+ASIC substrate) in the embodiment which will be described later.

According to the second embodiment, detection signals when the semiconductor radiation detectors detect radiation are processed by an application-specific IC called "ASIC (Application Specific Integrated Circuit)" and this embodiment is intended to solve an additional problem discovered by the inventor et al. that since the detection signals output from the semiconductor radiation detectors are weak, the ASIC is easily affected by noise. A reduction of the noise leads to substantial improvement of detection sensitivity (count, peak value, time detection accuracy) by the semiconductor radiation detectors.

Different substrates are preferably used as the substrate for mounting the semiconductor radiation detectors and the substrate for mounting the LSI. During ordinary operation, the two substrates are used in combination as a combined substrate (unified substrate) so that in the event of trouble, only the troubled substrate can be replaced to thereby facilitate maintenance and examination, etc.

A third embodiment of the present invention adopts a unit-type construction in which a plurality of unit substrates including semiconductor radiation detectors and an integrated circuit are mounted in a frame in a detachable/attachable manner. Since it is only necessary to mount a detector unit including a plurality of unit substrates on a nuclear medicine diagnostic apparatus, a plurality of semiconductor radiation detectors can be mounted on the nuclear medicine diagnostic apparatus at a time. In this way, the time required to mount the semiconductor radiation detectors on the nuclear medicine diagnostic apparatus can be shortened drastically.

The embodiment is preferably adapted so that these unit substrates can be removed from the detector unit one by one or the whole detector unit can be removed from the nuclear medicine diagnostic apparatus, or more specifically, from the camera, which facilitates maintenance and examination.

Note that many semiconductor radiation detectors are used for a nuclear medicine diagnostic apparatus (radiological diagnostic apparatus) such as PET, SPECT and gamma camera. For example, a PET uses a hundred thousand to several hundreds of thousands of (channels) semiconductor radiation detectors and there is a demand for shortening the time required to mount these many semiconductor radiation detectors on the nuclear medicine diagnostic apparatus. A fourth embodiment of the present invention is implemented to meet such a demand. There is also a demand for facilitating maintenance and examination of semiconductor radiation detectors.

The present invention can prevent or reduce deterioration of the detection sensitivity of radiation using semiconductor radiation detectors. The present invention can also prevent or reduce deterioration of signals detected by the semiconductor radiation detectors. This allows, for example, a nuclear medicine diagnostic apparatus to obtain clear images.

Other objects, features and advantages of the invention will become apparent from the following description of the embodiments of the invention taken in conjunction with the accompanying drawings.

BRIEF DESCRIPTION OF THE DRAWINGS

FIG. 13 is a perspective view showing a construction of a SPECT apparatus as a nuclear medicine diagnostic apparatus according to another embodiment;

DESCRIPTION OF THE EMBODIMENTS

Embodiment 1

A nuclear medicine diagnostic apparatus which is a preferred embodiment of the present invention will be explained with reference to attached drawings in detail below as appropriate. The following are explanations of the nuclear medicine diagnostic apparatus according to this embodiment, distance between electrodes of a semiconductor radiation detector, arrangement (layout) of elements such as analog ASIC on a substrate, and elements applicable to this embodiment for construction of substrate units, etc. Note that an analog ASIC refers to an ASIC (Application Specific Integrated Circuit) which is an application-specific IC for processing analog signals and is a kind of LSI.

<<Nuclear Medicine Diagnostic Apparatus>>

Figure 1:
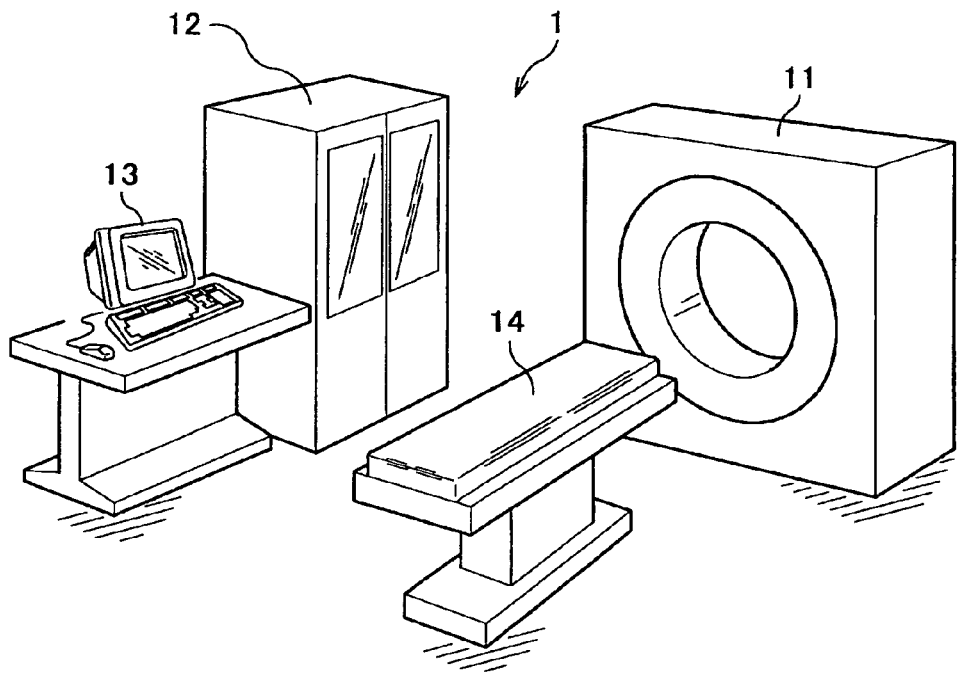
FIG. 1 is a perspective view showing a structure of a PET apparatus as a nuclear medicine diagnostic apparatus according to this embodiment.

First, the nuclear medicine diagnostic apparatus (radiological diagnostic apparatus) according to this embodiment will be explained. As shown in FIG. 1, a PET apparatus 1 as the nuclear medicine diagnostic apparatus is constructed by including a camera (image pickup apparatus) 11, a data processing apparatus 12, a display apparatus 13, etc. An examinee is laid on a bed 14 to be photographed using the camera 11. The camera 11 incorporates many semiconductor radiation detectors 21 (see FIG. 3, FIGS. 7A-7C, FIG. 10) to detect γ-rays emitted from the body of the examinee using semiconductor radiation detectors (hereinafter simply referred to as "detectors") 21. The camera 11 is provided with an integrated circuit (ASIC) for measuring peak values, detection times of γ-rays and is designed to measure peak values and detection times of detected radiations (γ-rays). The data processing apparatus 12 includes a storage apparatus, a simultaneous measuring apparatus 12A (see FIG. 2) and a tomographic information creation apparatus 12B (see FIG. 2). The data processing apparatus 12 takes in data of peak values, detection times of detected γ-rays and packet data including detector (channel) IDs. The simultaneous measuring apparatus 12A carries out simultaneous measurements based on this packet data, especially data of detection times and detector IDs, identifies detection positions of 511 KeV γ-rays and stores them in the storage apparatus. The tomographic information creation apparatus 12B creates a functional image based on the identified positions and displays it on the display apparatus 13.

Figure 2:
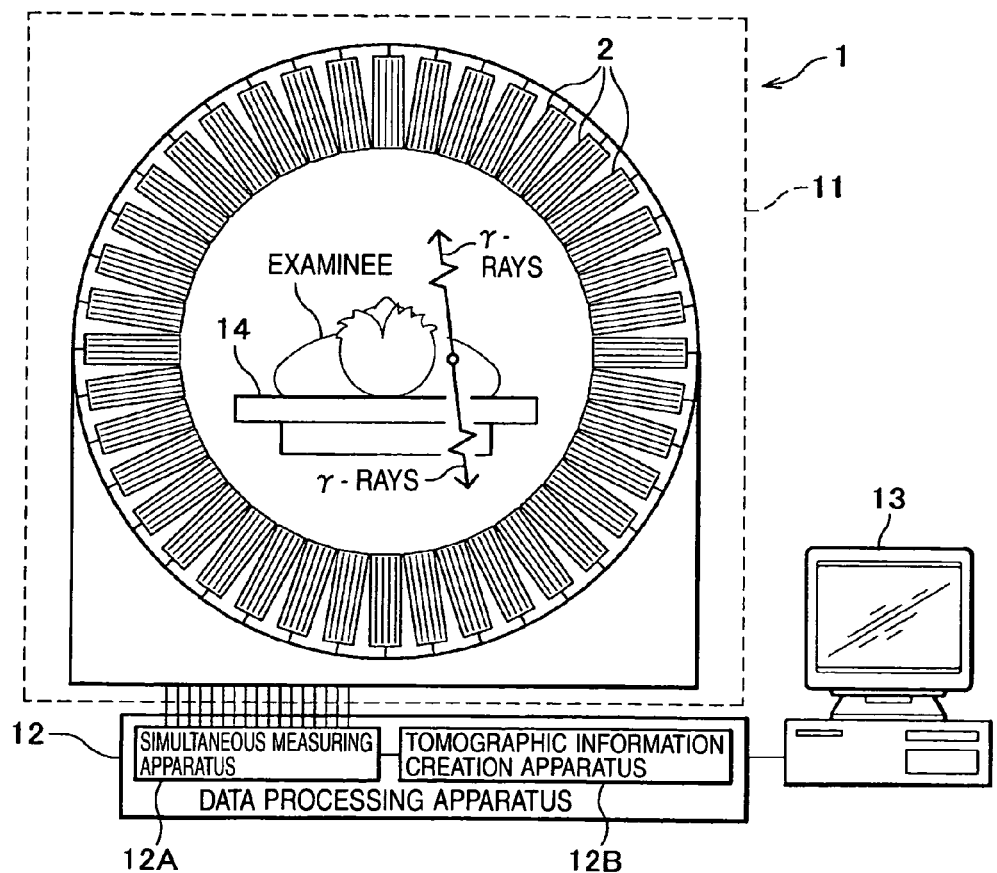
FIG. 2 schematically shows a cross section in a circumferential direction of the camera of the PET apparatus in FIG. 1.

As shown in FIG. 2, inside the camera 11, many detector units 2 (see FIG. 10 for details) housing a plurality of combined substrates 20 (see FIG. 7 for details) provided with many detectors 21 for detecting γ-rays emitted from the examinee are disposed circumferentially. The examinee is laid on the bed 14 and positioned at the center of the camera 11. At this time, the detectors are disposed so as to surround the bed 14. The detector unit 2 is designed to output for each detector 21 included in the detector unit 2, peak value information of γ-rays obtained based on a detection signal when a detector 21 interact with γ-rays, time information on γ-ray detection and address information (detector ID) of each detector 21. The constructions of the detector 21, combined substrate 20 and detector unit 2 will be explained in detail later. The examinee is administered radiopharmaceuticals, for example, fluorodeoxyglucose (FDG) containing $^{18}F$ whose half-life is 110 minutes. γ-rays (annihilated γ-rays) are emitted from the body of the examinee when positrons emitted from the FDG annihilate.

Hereafter, the characteristic parts of this embodiment will be explained.

<<Semiconductor Radiation Detector; Distance between Electrodes>>

Figure 3:
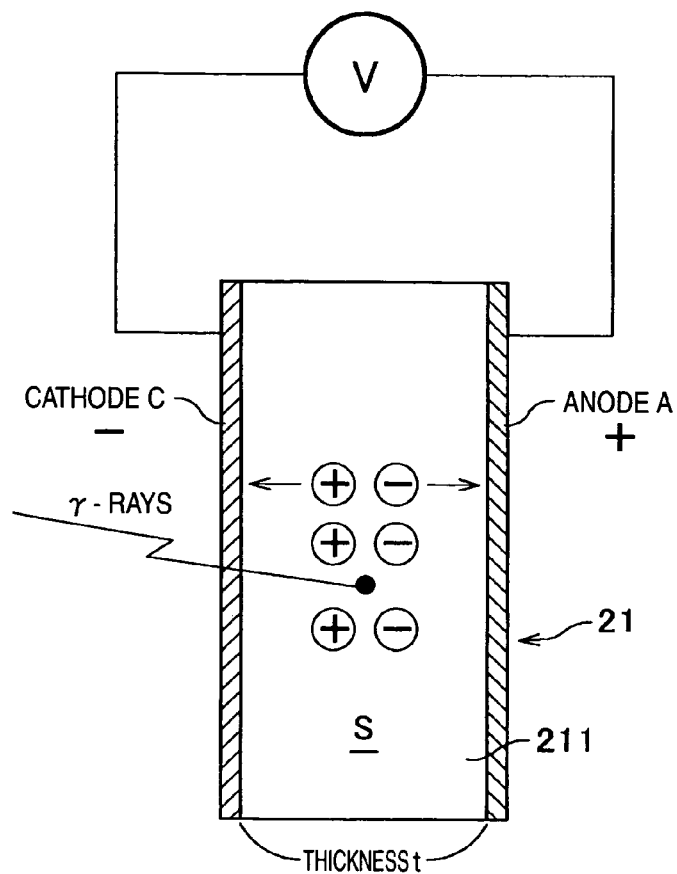
FIG. 3 schematically shows a structure of a semiconductor radiation detector in a minimum construction.

First, the detector 21 applied to this embodiment will be explained. As shown in FIG. 3, the detector 21 is constructed of a semiconductor radiation detection element (hereinafter referred to as "detection element") 211 made of a tabular semiconductor material S, both sides of which are covered with thin-plate (film) electrodes (anode A, cathode C) (minimum construction). Of these components, the semiconductor material S is made up of a single crystal of any one of the above described CdTe (cadmium telluride), TlBr (thallium bromide), GaAs (gallium arsenide), etc. Furthermore, the electrodes (anode A, cathode C) are made of any one material of Pt (platinum), Au (gold), In (indium), etc. In the following explanations, suppose the semiconductor material S is obtained by slicing a CdTe single crystal. Furthermore, suppose radiation to be detected is 511 KeV γ-rays used for the PET apparatus.

An overview of the principle of γ-ray detection using the detector 21 will be explained using FIG. 3. When γ-rays are introduced into the detector 21 and interaction occurs between γ-rays and the semiconductor material S constituting the detector 21, an amount of hole and electron pairs schematically shown in the figure with "+" and "−" corresponding to the energy of γ-rays is generated. Here, a voltage (e.g., 300 V) for charge collection is applied between the electrodes of the anode A and cathode C of the detector 21. Because of this, holes are moved attracted to the cathode C and electrons are moved attracted to the anode A. When holes and electrons are compared, as described in "Disclosure of the invention" the ease of movement (mobility) of electrons is relatively large and therefore electrons reach the anode in a shorter time. On the other hand, the mobility of holes is relatively small and therefore holes take more time to reach the cathode. Note that holes may be annihilated before reaching the electrode.

Figure 4:
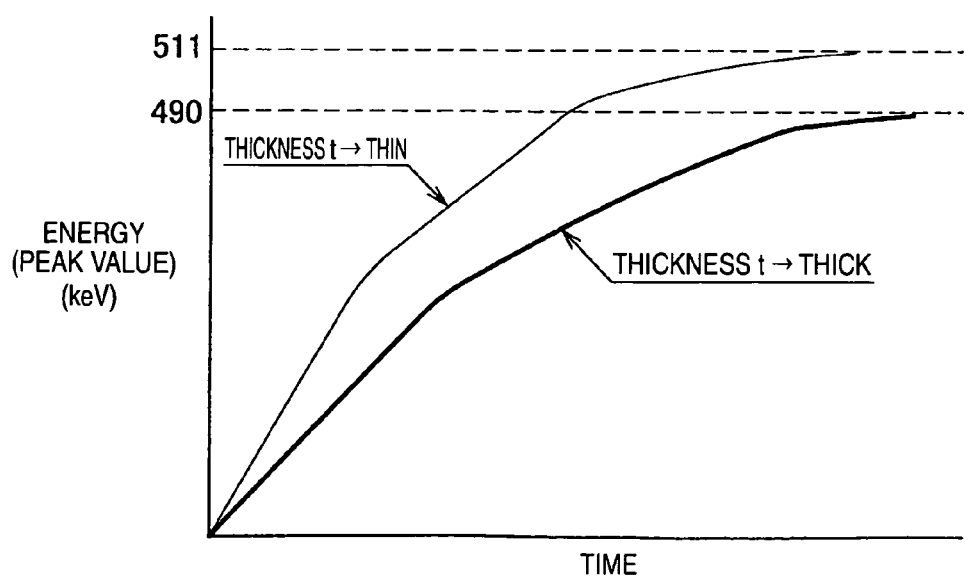
FIG. 4 is a graph comparing a "time-peak value curve" between a case where a thickness t of a semiconductor material of the semiconductor radiation detector is large and a case where it is small.

As shown in FIG. 4 which shows a comparison in the "time-peak value curve" between a case where the semiconductor material S (detection element 211) of the detector 21 is thick and a case where it is thin, the semiconductor material S having a smaller thickness t has a quicker rise of peak value and a higher maximum value of the peak value. Having a quicker rise of the peak value contributes to improvement of the accuracy of simultaneous measurement of the PET, for example. Furthermore, having a higher peak value contributes to increasing energy resolution. Thus, a smaller thickness t speeds up rising of the peak value and increases the peak value (the efficiency of charge collection improves) because the time for electrons and holes to reach the electrodes (anode A, cathode C) (time of charge collection) is shortened. This is also because holes which would be conventionally annihilated midway can reach the electrode (cathode C) without annihilation because of the shorter distance. Note that the thickness t can also be expressed by the distance between the electrodes, anode A and cathode C facing each other.

The thickness (distance between electrodes) t of the detection element 211 is preferably 0.2 mm to 2 mm. This is because a thickness t of not less than 2 mm slows down the rising speed of the peak value and reduces the maximum value of the peak value as well. On the other hand, a thickness t of smaller than 0.2 mm relatively increases the thickness (volume) of the electrodes (anode, cathode) and when installed on a substrate, the proportion of the very semiconductor material S that interacts with radiation decreases. That is, reducing the thickness t of the semiconductor material S relatively increases the thickness of the electrode which does not interact with γ-rays on one hand, and the proportion of the semiconductor material S which interacts with γ-rays relatively decreases on the other, with the result that the sensitivity of detecting γ-rays decreases (γ-rays pass by). Furthermore, a smaller thickness t may cause more leakage current preventing a high voltage from being applied for charge collection.

For the same reason, the thickness t of the semiconductor material S is preferably 0.5 mm to 1.5 mm and such a thickness t allows more reliable detection of γ-rays and more correct measurement of the peak value, etc.

In the case of the PET apparatus 1, since it carries out simultaneous measurement, one of problems to be solved is to correctly measure a γ-ray detection time. For example, in FIG. 3, there is a difference in a detection time when positions at which γ-rays interact with the semiconductor material S are closer to the cathode C and when those positions are closer to the anode A. That is, since the moving speed of holes is lower, the detection time when the interaction occurs closer to the anode A is relatively late, while the detection time when the interaction occurs closer to the cathode C is relatively early (approximates to a real time). That is, also when γ-rays interact with the semiconductor material S in the same detection element 211, there is a problem that the detection time changes depending on the position at which the interaction takes place. More specifically, when the thickness t is large, the difference in the detection time depending on the position at which the interaction takes place increases. Such an event constitutes no big problem in other fields, but it constitutes a big problem in the case of the PET apparatus 1, which carries out simultaneous measurement (simultaneous counting) on the order of nsec (nanoseconds). Therefore, in this sense, too, it is possible to determine the detection time appropriately within the above described thickness range. The detection time is determined by the PET according to an LET system or CFD system.

Figure 5:
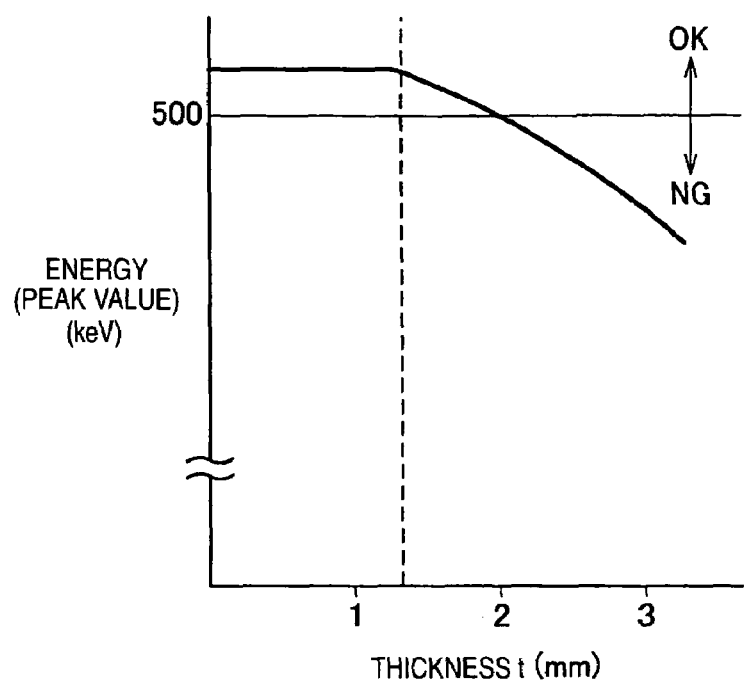
FIG. 5 is a graph schematically showing a relationship between the thickness t of a semiconductor material and a peak value (maximum value) of a semiconductor radiation detector.

As shown in FIG. 5 which schematically shows a relationship between the thickness t of the semiconductor material S and peak value (maximum value) of the detector 21, the maximum value of the peak value decreases as the thickness t of the semiconductor material S increases. One of reasons that the peak value decreases is that holes are annihilated before reaching the electrode. When the thickness t becomes 2 mm, the peak value of detected radiation falls short of a threshold whereby it is possible to discriminate 511 KeV γ-rays, and therefore it is not preferable to increase the thickness t of the semiconductor material S more than 2 mm as described above.

Figure 6:
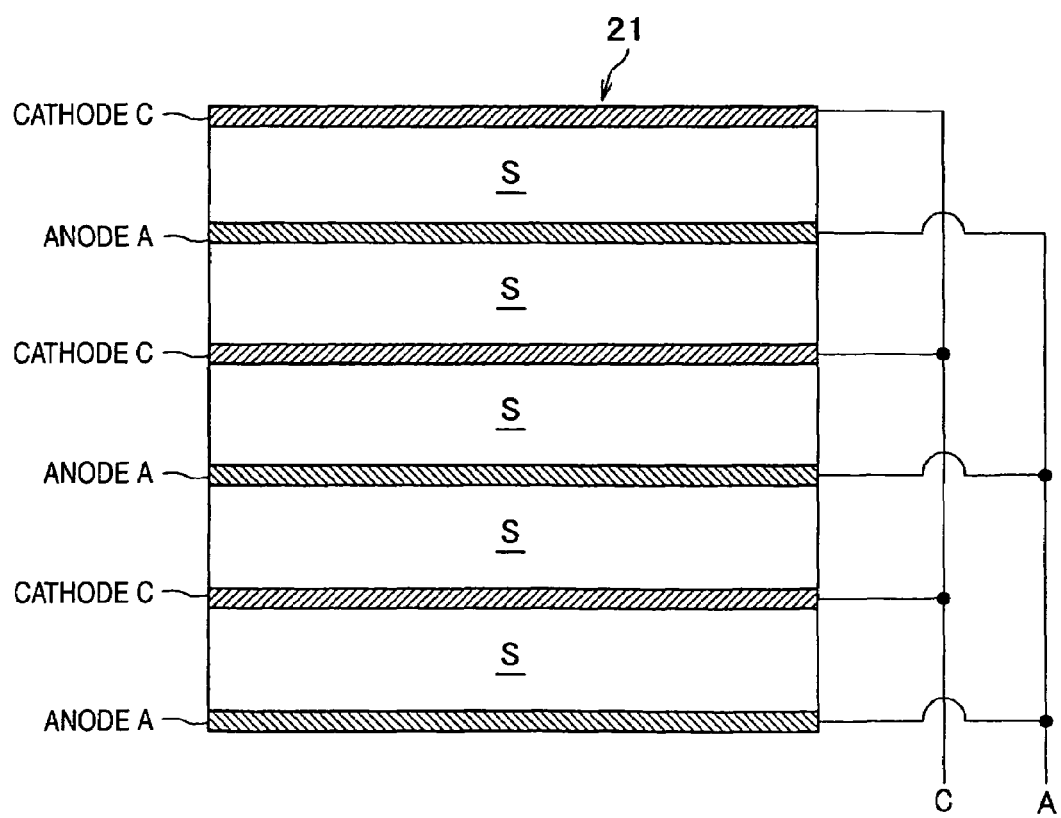
FIG. 6 schematically illustrates a construction of a semiconductor radiation detector having a laminated structure of semiconductor materials and electrodes (anodes, cathodes)

As shown in FIG. 6, the detector 21 includes the semiconductor materials S (detection elements 211) laminated in five layers each sandwiched between the cathode C and anode A. Each layer of the semiconductor material S is a single layer detector 21 having the aforementioned thickness t (0.2 to 2 mm (more preferably 0.5 to 1.5 mm)). The thickness of the anode A and cathode C is approximately 20 microns. In the detector 21 having a laminated structure shown in this FIG. 6, the different anodes A or different cathodes C are connected to a common wire, and therefore each layer is not designed to detect radiation independently of other layers. In other words, when γ-rays interact with the semiconductor material S, it is not possible to discriminate whether the interaction takes place on the top layer or bottom layer. Of course, it is also possible to adopt a structure in which radiation is detected by each layer. This five-layer structure is adopted because reducing the thickness t of the semiconductor material S is preferable in increasing the rising speed of the peak value and increasing the maximum value of the peak value, but a small thickness t causes more γ-rays to pass by, and therefore reducing the amount of γ-rays that pass by while increasing the efficiency of charge collection increases interaction between the semiconductor material S and γ-rays (to increase a count value).

Adopting the detector 21 having such a laminated structure can obtain a better peak value rising speed and an accurate peak value and increase the number of γ-rays (count value)(increase the sensitivity) that interact with the semiconductor material S.

An area s of the electrode (anode A, cathode C) is preferably 4 to 120 mm$^2$. An increase of the area s increases the capacity (stray capacitance) of the detector 21 and this increase in the stray capacitance makes noise easier to superimpose, and therefore the area s of the electrode is preferably as small as possible. Furthermore, charge produced when γ-rays are detected is partially accumulated in the stray capacitance, and therefore there is a problem that when the stray capacitance increases, the amount of charge stored in a charge amplifier 24b of an analog ASIC 24 or further an output voltage (peak value) decreases. When CdTe is used for the detector 21, its dielectric constant is 11 and if the area s of the detector 21 is 120 mm$^2$, thickness t is 1 mm, then the capacity is 12 pF, which is not negligible considering the fact that the stray capacitance of connectors, etc. of the circuit is several pF. Therefore, the area s of the electrode is preferably 120 mm$^2$ or less.

Furthermore, the lower limit of the area s of the electrode is determined by position resolution of the PET apparatus. The position resolution of the PET apparatus is determined by not only the size (array pitch) of the detector 21 but also the positron range, etc., but since the range of positron of 18F is 2 mm, setting the size of the detector 21 to 2 mm or less is meaningless. The method of mounting so that the area of the electrode becomes a minimum is a case where the surface of the electrode is placed perpendicular to the radius direction of the camera 11 and from the above described consideration, the lower limit of one side of the electrode is 2 mm and the lower limit of the area s of the electrode is 4 mm$^2$.

In the above described explanations, CdTe is used as the semiconductor material S which interacts with γ-rays, but it goes without saying that the semiconductor material S may also be TlBr or GaAs, etc. Moreover, the terms "laminated structure", "upper layer" and "lower layer" have been used, but these are based on FIG. 6 and when the viewing direction is turned by 90° toward the horizontal direction, the laminated structure may be read as a parallel structure and top/bottom may be read as right/left, for example. Moreover, the direction of incident γ-rays may also be upward, downward, rightward and leftward in FIG. 6. In other words, the detector 21 has a structure in which a plurality of (e.g., five) semiconductor materials S are arranged in parallel in such a way as to sandwich cathodes C and anodes A alternately.

<<Combined Substrate; Detector Substrate and ASIC Substrate>>

A detailed structure of the combined substrate (unit substrate) 20 installed in the detector unit 2 (FIG. 10) will be explained using FIGS. 7A-7C. The combined substrate (semiconductor radiation detection apparatus) 20 comprises a detector substrate (first substrate) 20A in which a plurality of detectors 21 are arranged and an ASIC substrate (second substrate) 20B in which a capacitor 22, a resistor 23, analog ASICs 24, analog/digital converters (hereinafter referred to as "ADC") 25 and a digital ASIC 26 are arranged.

(Detector Substrate)

Figures 7A, 7B:
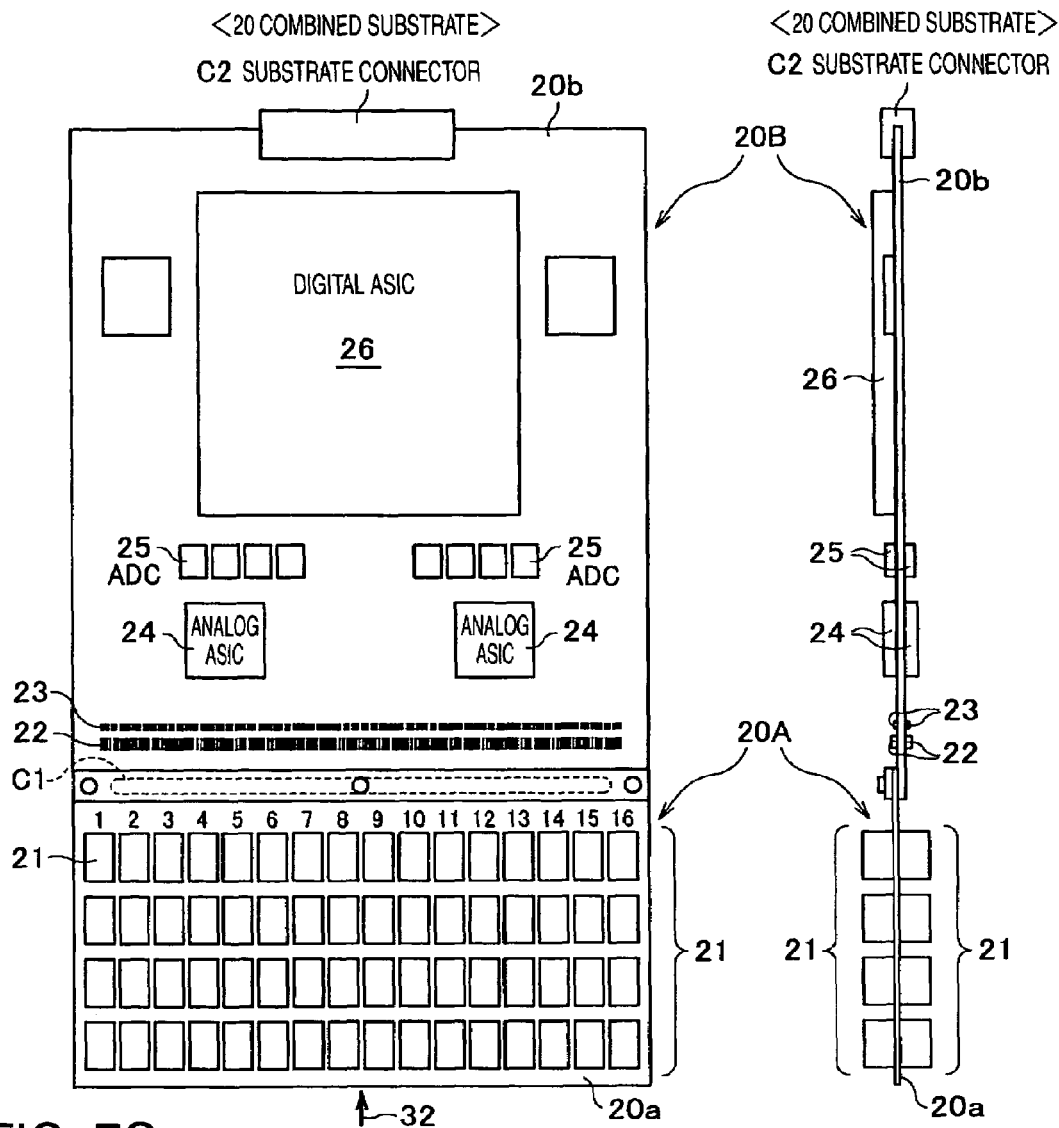
FIG. 7A is a front view of a combined substrate which combines a detector substrate and an ASIC substrate of the semiconductor radiation detectors according to this embodiment.
FIG. 7B is a side view of FIG. 7A
Figure 7C:
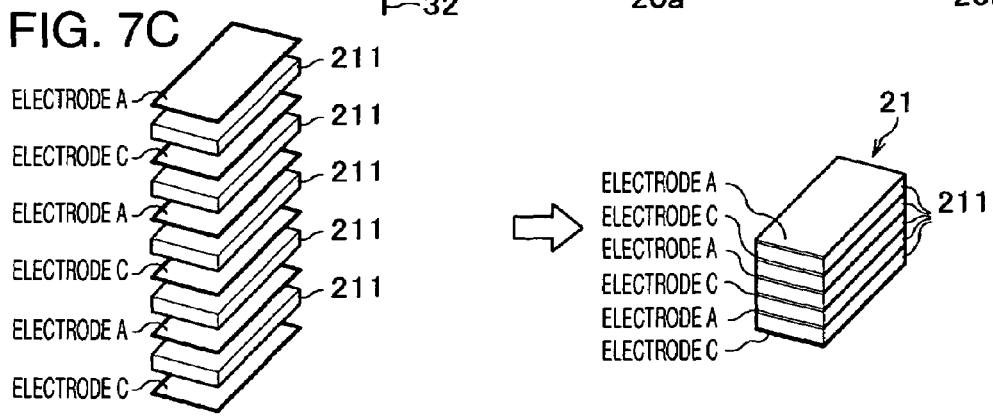
FIG. 7C is a perspective view schematically showing a construction of the semiconductor radiation detector mounted on the detector substrate in FIG. 7A.

With reference to FIGS. 7A-7C, the detector substrate 20A provided with the detectors 21 will be explained. As shown in FIG. 7A, the detector substrate 20A has a grid-like arrangement (mounting) of a plurality of detectors 21 on one side of a substrate body 20a (4 rows of 16 detectors 21=horizontal 16×vertical 4=total 64 detectors). In the radius direction of the camera 11, the detectors 21 are arranged in four rows on the substrate body 20a. The 16 detectors 21 in the horizontal direction are arranged in the axial direction of the camera 11, that is, in the longitudinal direction of the bed 14. Furthermore, as shown in FIG. 7B, since the semiconductor radiation detectors 21 are arranged on both sides of the detector substrate 20A, a total of 128 detectors 21 are arranged on one detector substrate 20A. Here, as the number of detectors 21 to be installed increases, it is easier to detect γ-rays and it is possible to increase position accuracy when γ-rays are detected. For this reason, the detectors 21 are disposed on the detector substrate 20A as densely as possible. In FIG. 7A, when γ-rays emitted from the examinee on the bed 14 travel from bottom to top in the figure (direction indicated by an arrow 32, that is, radius direction of the camera 11), arranging the detectors 21 in the left-to-right direction densely on the detector substrate 20A is preferable because in this way, the number of γ-rays that pass by (the number of γ-rays that pass through the gap between the detectors 21) is reduced. This increases the detection efficiency of γ-rays and increases spatial resolution of an image obtained.

As shown in FIG. 7B, the detector substrate 20A of this embodiment arranges the detectors 21 on both sides of the substrate body 20a, and therefore the substrate body 20a can be shared by both sides compared to the case where the detectors 21 are arranged only on one side. For this reason, it is possible to reduce the number of substrate bodies 20a by half and arrange the detectors 21 more densely in the circumferential direction. Moreover, as described above, the number of detector substrates 20A (combined substrates 20) can be reduced by half, and therefore there is a merit of saving time and trouble to mount the combined substrates 20 in the housing 30 (see FIG. 10) which will be described later.

In the above described explanations, the 16 horizontal detectors 21 are arranged in the axial direction of the camera 11, but the arrangement is not limited to this. For example, the 16 horizontal detectors 21 may also be arranged in the circumferential direction of the camera 11.

As shown in FIG. 7C, each detector 21 has a laminated structure of single crystals of the aforementioned thin-film semiconductor materials S (detection elements 211). The structure and function thereof have already been explained with reference to FIG. 6, but supplementary explanations will be given here. As described above, the detector 21 is provided with the anode A and cathode C and a potential difference (voltage) of, for example, 300 V is applied between the anode A and cathode C for charge collection. This voltage is supplied from the ASIC substrate 20B to the detector substrate 20A via the connector C1 (FIG. 7A). Furthermore, the signal detected by each detector 21 is supplied to the ASIC substrate 20B via the connector C1. Thus, on-board wiring (for charge collection and signal exchange) (not shown) for connecting the connector C1 and each detector 21 is provided in the substrate body 20a of the detector substrate 20A. This on-board wiring has a multi-layered structure. In this embodiment, the detection elements 211 of the detector 21 are arranged in parallel to the substrate body 20a. However, the detectors 21 may also be provided so that the respective detection elements 211 are disposed perpendicular to the substrate body 20a.

(ASIC Substrate)

Then, the ASIC substrate 20B incorporating the ASIC will be explained. As shown in FIG. 7A, the ASIC substrate 20B is provided with two analog ASICs 24 and one digital ASIC 26 on one side of the substrate body 20b. Furthermore, as shown in FIG. 7B, since the analog ASICs 24 are provided on both sides of the substrate body 20b, one ASIC substrate 20B includes a total of four analog ASICs 24. Furthermore, the ASIC substrate 20B includes eight (=4×2) ADCs 25 on one side of the substrate body 20b and sixteen ADCs 25 on both sides. Furthermore, as many capacitors 22 and resistors 23 as the detectors 21 are arranged on both sides of one substrate body 20b. Furthermore, to electrically connect theses capacitors 22, resistors 23, analog ASICs 24, ADCs 25 and digital ASIC 26, the ASIC substrate 20B (substrate body 20b) is provided with on-board wiring (not shown) as with the above described detector substrate 20A. This on-board wiring also has a laminated structure.

These elements 22, 23, 24, 25 and 26 are arranged (on-board wiring) so that a signal supplied from the detector substrate 20A is supplied to the capacitor 22, resistor 23, analog ASIC 24, ADC 25 and digital ASIC 26 in that order.

The ASIC substrate 20B includes a connector (spiral contact) C1 which is connected to the on-board wiring which is connected to each capacitor 22 to make electrical connections to the detector substrate 20A and a substrate connector C2 which makes electrical connections to the data processing apparatus (the unit combination FPGA which will be described later). Note that the above described detector substrate 20A also includes the connector C1 connected to the on-board wiring which is connected to each detector 21.

(Connection Structure between Detector Substrate and ASIC Substrate)

The connection structure between the detector substrate 20A and ASIC substrate 20B will be explained.

The detector substrate 20A and ASIC substrate 20B are connected not with their respective end faces (ends) facing each other but by providing an overlap area where both ends overlap with each other and connecting the connectors C1 in this overlap area as shown in FIG. 7B. This connection is made in a detachable/attachable manner using screws for clamping. These connections are made for the following reason. That is, when the combined substrate 20 made up of the detector substrate 20A and ASIC substrate 20B connected (combined) together is supported on one end (cantilever support) or on both ends in the horizontal direction, a force which flexes or bends the combined substrate 20 downward is applied to the central area (connection area) of the combined substrate 20. Here, in the case where both ends are the connection area where their respective end faces (ends) face each other, the connection area is easily flexed or bent, which is not preferable.

With consideration given to this aspect, this embodiment connects the detector substrate 20A and ASIC substrate 20B not with the respective end faces facing each other but by providing the overlap area so that the areas close to the ends overlap with each other as described above. This improves toughness against flexure or bending compared to the connection with the end faces facing each other, which is preferable. Moreover, improving toughness against flexure or bending of the combined substrate suppresses dislocation of the detectors 21 and prevents deterioration of accuracy of identifying positions at which γ-rays are generated. As shown in FIG. 2, the camera 11 of the PET apparatus 1 is provided with many detector units 2 (FIG. 10) including the combined substrate 20 shown in FIGS. 7A-7C in a doughnut shape and these combined substrates 20 disposed at positions of 3 o'clock and 9 o'clock in the horizontal direction in FIG. 2 are liable to flexure or bending. Thus, the toughness of the combined substrates 20 against flexure or bending becomes important.

The detector substrate 20A and ASIC substrate 20B are electrically connected using the aforementioned overlap area. For this purpose, a connector C1 (FIG. 7A) which electrically connects the on-board wiring of both the substrates 20A and 20B is provided in the respective overlap areas of the detector substrate 20A and ASIC substrate 20B shown in FIG. 7B. For the connector C1, for example, a spiral contact (R) is used to improve electrical connections. The spiral contact(R) is made of a ball-shaped connection terminal contacting a spiral contactor over a wide area and provides a characteristic of realizing optimal electrical connections. Note that when the ball-shaped connection terminal is provided on the ASIC substrate 20B side, the spiral contactor is provided on the detector substrate 20A side, and when the ball-shaped connection terminal is provided on the detector substrate 20A side, the spiral contactor is provided on the ASIC substrate 20B side.

Using such an electrical connection structure between the detector substrate 20A and ASIC substrate 20B allows signals to be sent from the detector substrate 20A to the ASIC substrate 20B with low loss. Note that when loss is small, the energy resolution on the part of the detectors 21 improves.

Furthermore, as described above, the detector substrate 20A and ASIC substrate 20B are connected in a freely detachable/attachable manner by means of screws, etc. Thus, even when trouble occurs in the semiconductor radiation detectors 21 or ASICs 24, 26, all that should be done is just to replace the part with trouble. Therefore, this eliminates waste that the entire combined substrate 20 must be replaced due to trouble in that part. Moreover, since electrical connection between the detector substrate 20A and ASIC substrate 20B is made by the connector C1 such as the aforementioned spiral contactor (R), connection or disconnection (combination or dissociation) between the substrates can be done easily.

In the above described construction, one detector substrate 20A is connected to the ASIC substrate 20B, but it is also possible to divide the detector substrate into a plurality of portions. For example, two detector substrates may be connected to the ASIC substrate, each consisting of eight horizontal by four vertical detectors 21. According to this construction, if one detector 21 has trouble, of the two detector substrates, only the one including the faulty detector 21 needs to be replaced and it is therefore possible to reduce waste in maintenance (cost reduction).

(Element Layout)

Then, the layout of elements such as the detectors 21, ASICs 24, 26 of the combined substrate 20 will be explained with reference to FIGS. 7A-7C and FIG. 8.

Figure 8:
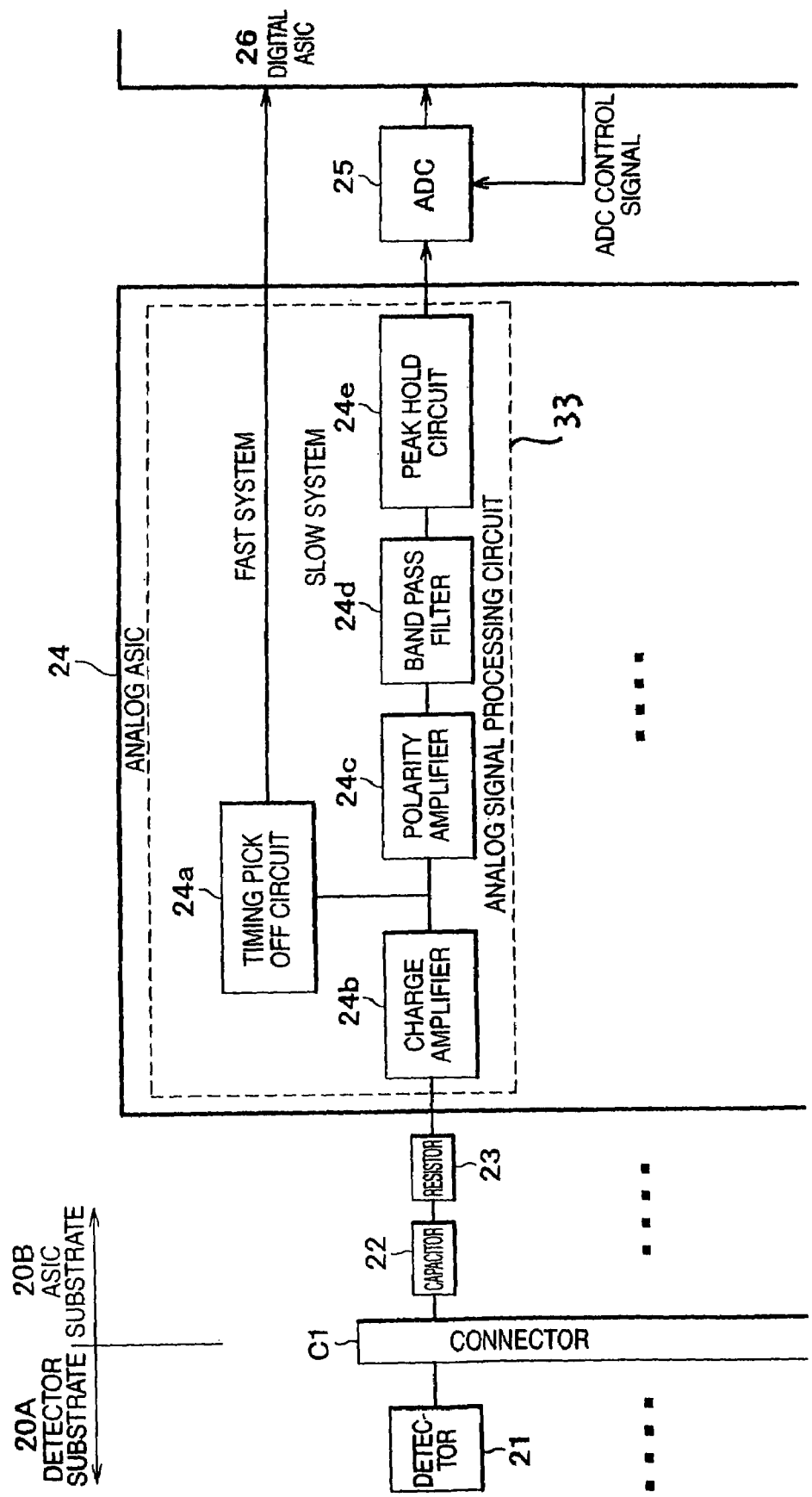
FIG. 8 is a block diagram schematically showing an analog detection circuit.

As shown in FIG. 8, the detector 21 is connected to the analog ASIC 24 through the connector C1, capacitor 22 and resistor 23 by means of electrical wiring (not shown) and a detection signal of γ-rays detected by the detector 21 is passed through the capacitor 22 and resistor 23 by means of the electrical wiring and processed by the analog ASIC 24. Furthermore, the signal processed by the analog ASIC 24 is also processed by the ADC 25 and digital ASIC 26.

Here, the shorter the length of the circuit and length (distance) of the wiring, the better, because there is less influence of noise or less attenuation of a signal. Furthermore, when simultaneous measurement processing is carried out by the PET apparatus 1, a shorter circuit or wiring is preferred because its time delay is smaller (preferable because the accuracy of detection time is not lost). For this reason, in order of the detector 21, capacitor 22, resistor 23, analog ASIC 24, ADC 25 and digital ASIC 26 from the center axis of the camera 11 outward in the radius direction of the camera 11, that is, the elements 21, 22, 23, 24, 25 and 26 are arranged (layout) in this embodiment as shown in FIG. 7A. This order is the same as the signal processing order by the elements 21, 22, 23, 24, 25 and 26 (see FIG. 8, FIG. 9). That is, from the center axis of the camera 11 outward, the "detector, analog integrated circuit, AD converter and digital integrated circuit" are arranged on the substrate in that order and wired in the same order. Thus, it is possible to transmit a weak signal detected by the detector 21 to the analog ASIC 24 with the wiring length (distance) shortened.

Since the signal of the analog ASIC 24 is subjected to processing such as amplification, it is less susceptible to influences of noise even if the length of wiring from the analog ASIC 24 onward is long. That is, considering noise, there is no problem even if the wiring length from the analog ASIC 24 onward is long. However, with lengthy wiring, there is a delay in signal transmission and the accuracy of the above described detection time may deteriorate.

In this embodiment, since not only the detector 21 but also the analog ASIC 24 and digital ASIC 26 are included in one combined substrate 20, the detector 21, analog ASIC 24 and digital ASIC 26 can be arranged in the longitudinal direction of the bed 14, that is, the direction perpendicular to the body axis of the examinee subject to an examination, and therefore this eliminates the need to extend the length of the camera (image pickup apparatus) 11 in the longitudinal direction of the bed more than necessary. It is also possible to consider the possibility of arranging the analog ASIC 24 and digital ASIC 26 outside in the radius direction of the annularly arranged detector group, and in the longitudinal direction of the bed 14, but this causes the length of the camera 11 in the longitudinal direction of the bed to become longer than necessary. Furthermore, semiconductor radiation detectors are used as the detectors 21, and analog ASIC 24 and digital ASIC 26 are used as signal processing apparatuses, the length of the combined substrate 20 in the longitudinal direction is shortened and the length of the camera 11 in the orthogonal direction can be shortened significantly compared to the case where a scintillator is used. Furthermore, the combined substrate 20 is provided with the detector 21, analog ASIC 24 and digital ASIC 26 in that order in the longitudinal direction thereof, and therefore it is possible to shorten the length of the wiring connecting them and simplify the wiring on the substrate.

Figure 9:
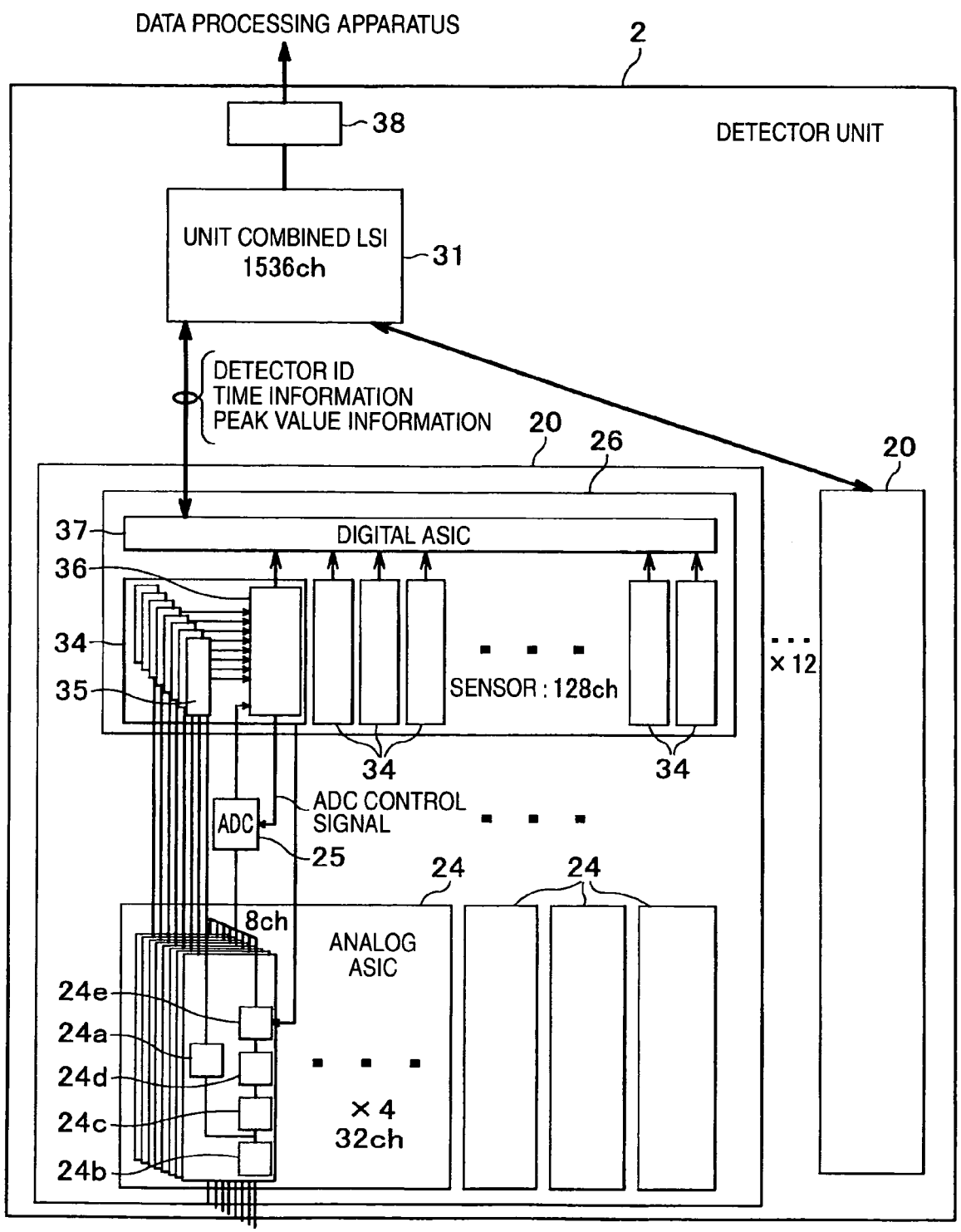
FIG. 9 is a block diagram showing a schematic construction of a digital ASIC and a connection relationship between an analog ASIC and the digital ASIC.

Here, in this embodiment, one analog ASIC 24 is connected to 32 detectors 21 to process signals obtained from the detectors 21. As shown in FIG. 8 and FIG. 9, one analog ASIC 24 is provided with 32 sets of an analog signal processing circuit (analog signal processing apparatus) 33 made up of a slow system and fast system. One analog signal processing circuit 33 is provided for each detector 21 and connected to one detector 21. Here, the fast system is provided with a timing pick off circuit 24a to output a timing signal for identifying a detection time of γ-rays. On the other hand, the slow system is provided with a polarity amplifier (linear amplifier) 24c, a band pass filter (waveform shaping apparatus) 24d and a peak hold circuit (peak value holding apparatus) 24e connected in this order for the purpose of calculating a peak value of the detected γ-rays. Note that the slow system is named "slow" because it takes a certain degree of processing time to calculate a peak value. Reference numeral 24b denotes a charge amplifier (preamplifier). A γ-ray detection signal output from the detector 21 and passed through the capacitor 22 and resistor 23 is amplified at the charge amplifier 24b and polarity amplifier 24c. The amplified gamma-ray detection signal is passed through the band pass filter 24d and input to the peak hold circuit 24e. The peak hold circuit 24e holds a maximum value of the detection signal, that is, the peak value of a γ-ray detection signal proportional to energy of the detected γ-rays. One analog ASIC 24 is an LSI which integrates 32 sets of analog signal processing circuits 33.

The capacitor 22 and resistor 23 can also be provided inside the analog ASIC 24, but this embodiment arranges the capacitor 22 and resistor 23 outside the analog ASIC 24 for reasons such as obtaining an appropriate capacitance and appropriate resistance and reducing the size of the analog ASIC 24. Note that the capacitor 22 and resistor 23 are preferably disposed outside because in this way variations in the individual capacitance and resistance are reduced.

In the analog ASIC 24 shown in FIG. 8, the output of the slow system of this analog ASIC 24 in this embodiment is designed to be supplied to an ADC (analog/digital converter) 25. Moreover, the output of the fast system of the analog ASIC 24 is designed to be supplied to the digital ASIC 26.

The analog ASIC 24 and each ADC 25 are connected via one wire which sends slow system signals corresponding to 8 channels all together. Furthermore, each analog ASIC 24 and digital ASIC 26 are connected via 32 wires which send 32-channel fast system signals one by one. That is, one digital ASIC 26 is connected to four analog ASICs 24 via a total of 128 wires.

The output signal of the slow system output from the analog ASIC 24 is an analog peak value (maximum value of the graph shown in FIG. 4). Furthermore, the output signal of the fast system output from the analog ASIC 24 to the digital ASIC is a timing signal showing the timing corresponding to the detection time. Of these signals, the peak value which is the slow system output is input to the ADC 25 via the wire (wire uniting 8 channels into one) connecting the analog ASIC 24 and ADC 25 and converted to a digital signal by the ADC 25. The ADC 25 converts a peak value to, for example, an 8-bit (0 to 255) digital peak value (e.g., 511 KeV→255). On the other hand, a timing signal which is a slow system output is supplied to the digital ASIC 26 via the above described wire connecting the analog ASIC 24 and digital ASIC 26.

The ADC 25 sends the digitized 8-bit peak value information to the digital ASIC 26. For this purpose, each ADC 25 and digital ASIC 26 are connected via a wire. For example, since there are sixteen ADCs 25 on both sides, the digital ASIC 26 is connected to the ADC 25 via a total of sixteen wires. One ADC 25 processes signals corresponding to 8 channels (signals corresponding to eight detection elements). The ADC 25 is connected to the digital ASIC 26 via one wire for transmission of an ADC control signal and one wire for transmission of peak value information.

As shown in FIG. 9, the digital ASIC 26 comprises a plurality of packet data generation apparatuses 34 including eight time decision circuits (time information generation apparatuses) 35 and one ADC control circuit (ADC control apparatus) 36, and a data transfer circuit (data transmission apparatus) 37, and integrates all these elements into one LSI. All the digital ASICs 26 provided for the PET apparatus 1 receive a 500 MHz clock signal from a clock generation apparatus (crystal oscillator) (not shown) and operates synchronously. The clock signal input to each digital ASIC 26 is input to the respective time decision circuits 35 in all the packet data generation apparatuses 34. One time decision circuit 35 is provided for each detector 21 and receives a timing signal from the timing pick off circuit 24a of the corresponding analog signal processing circuit 33. The time decision circuit 35 determines the detection time of γ-rays based on the clock signal when the timing signal is input. Since the timing signal is based on the fast system signal of the analog ASIC 24, a time close to a real detection time can be set as the detection time (time information). The ADC control circuit 36 receives a timing signal for the timing at which γ-rays are detected from the time decision circuit 35 and identifies the detector ID. That is, the ADC control circuit 36 stores a detector ID corresponding to each time decision circuit 35 connected to the ADC control circuit 36 and can identify, when time information is input from a certain time decision circuit 35, the detector ID corresponding to the time decision circuit 35. This is possible because one time decision circuit 35 is provided for each detector 21. Moreover, after inputting the time information, the ADC control circuit 36 outputs an ADC control signal including detector ID information to the ADC 25. The ADC 25 outputs the peak value information output from the peak hold circuit 24e of the analog signal processing circuit 33 corresponding to the detector ID by converting it to a digital signal. This peak value information is input to the ADC control circuit 36. The ADC control circuit 36 adds the peak value information to the time information and detector ID to create packet data. The ADC control circuit 36 has the functions of the ADC control apparatus for controlling the ADC 25 and the information combination apparatus for combining the detector ID information (detector position information), time information and peak value information. The information combination apparatus outputs combination information (packet information) which is digital information including those three kinds of information. The packet data (including detector ID, time information and peak value information) output from the ADC control circuit 36 of each packet data generation apparatus 34 is input to the data transfer circuit 38.

The data transfer circuit 38 sends packet data which is digital information output from the ADC control circuit 36 of each packet data generation apparatus 34 to the integrated circuit (unit combination FPGA (Field Programmable Gate array)) 31 for unit combination provided for the housing 30 of the detector unit 2 (FIG. 10, FIG. 11) which houses twelve combined substrates 20, for example, periodically. The unit combination FPGA (hereinafter referred to as "FPGA") 31 sends the digital information to the data processing apparatus 12 through an information transmission wire connected to the connector 38.

Since the ADC 25 converts the peak value information output from the peak hold circuit 24e corresponding to the detector ID information included in a control signal output from the ADC control circuit 36 to a digital signal, one ADC 25 is provided for a plurality of analog signal processing circuits 33 in one analog ASIC 24. Therefore, there is no need to provide one ADC 25 for each of a plurality of analog signal processing circuits 33 and it is possible to thereby significantly simplify the circuit construction of the ASIC substrate 20B. Also one information combination apparatus for generating combination information is enough for a plurality of analog signal processing circuits 33 in one analog ASIC 24, which can simplify the circuit construction of the digital ASIC 26. Moreover, only one ADC control apparatus for identifying detector IDs needs to be provided for a plurality of analog signal processing circuits 33 in one analog ASIC 24, simplifying the circuit construction of the digital ASIC 26.

In this way, packet data output from the digital ASIC 26 and including detector IDs for uniquely identifying (1) peak value information, (2) determined time information and (3) detector 21, one by one is sent to the next data processing apparatus 12 (see FIG. 1) through an information transmission wire. The simultaneous measuring apparatus 12A of the data processing apparatus 12 carries out simultaneous measuring processing (when two γ-rays with predetermined energy are detected with a time window with a set time, this processing regards these γ-rays as a pair of γ-rays generated by annihilation of one positron) based on the packet data sent from the digital ASIC 26, counts the simultaneously measured pair of γ-rays as one γ-ray and identifies the positions of the two detectors 21 which have detected the pair of γ-rays using those detector IDs. When there are three or more γ-rays detection signals detected within the above described time window (when there are three or more detected detectors 21 which have detected γ-rays) the data processing apparatus 12 identifies the two detectors 21 into which γ-rays are introduced first out of three or more detectors 21 using peak value information, etc., on those γ-ray detection signals. The identified one pair of detectors 21 are simultaneously measured and one count value is generated. Furthermore, the tomographic information creation apparatus 12B of the data processing apparatus 12 creates tomographic information on the examinee at the position where radiopharmaceuticals are concentrated, that is, position of malignant tumor, using count values obtained by simultaneous measurement and position information on the detectors 21. This tomographic information is displayed on the display apparatus 13. Information such as the above described digital information, count value obtained by simultaneous measurement and position information on the detectors 21 and tomographic information are stored in the storage apparatus of the data processing apparatus 12.

According to the above described explanations, the detector substrate 20A includes the detectors 21 and the ASIC substrate 20B includes the capacitor 22, resistor 23, analog ASIC 24, ADC 25 and digital ASIC 26. However, the detector substrate (first substrate) 20A may include the detector 21, capacitor 22, resistor 23 and analog ASIC 24, etc., and the ASIC substrate (second substrate) 20B may include the ADC 25 and digital ASIC 26, etc. By the detector substrate 20A including the detectors 21 and analog ASIC 24, the distance (wire length) between the detector 21 and analog ASIC 24 can be further shortened. Thus, it is possible to further reduce influences of noise.

Furthermore, the combined substrate 20 may include three substrates (detector substrate 20A, analog ASIC substrate and digital ASIC substrate) and they may be connected in a detachable/attachable manner through their respective connectors.

In this case, of the three substrates, the detector substrate 20A includes the detectors 21, the analog ASIC substrate includes the capacitor 22, resistor 23 and analog ASIC 24 and the digital ASIC substrate includes the ADC 25 and digital ASIC 26. This structure separates the substrate incorporating the analog circuit from the substrate incorporating the digital circuit to thereby prevent noise on the digital circuit side from entering the analog circuit. Furthermore, this structure separates the substrate incorporating the analog ASIC from the substrate incorporating the digital ASIC and connects the two substrates using a detachable/attachable connector, and therefore even when only the digital ASIC malfunctions, only the digital ASIC substrate needs to be replaced. In this way, this structure can further reduce waste.

In the above explanations, the substrate body 20a (detector substrate 20A) for mounting the detectors 21 is different from the substrate body 20b (ASIC substrate 20B) for mounting the ASICs 24, 26. Thus, when, for example, both ASICs are soldered to a substrate by means of a BGA (Ball Grid Array) using reflow, only the ASIC substrate can be soldered and this is preferable because the semiconductor radiation detector 21 need not be exposed to a high temperature. Of course, it is also possible to arrange all the elements 21 to 26 on the same substrate and use no connector C1.

<<Detector Unit; Unit Construction through Housing of Combined Substrate>>

Next, a unit construction by housing the above described combined substrate 20 in the housing 30 will be explained. This embodiment constructs a detector unit (twelve substrate units) 2 by housing twelve combined substrates 20 in the housing (frame) 30. The camera 11 of the PET apparatus 1 has a structure in which 60 to 70 detector units 2 are arranged in the circumferential direction in a detachable/attachable manner (see FIG. 12B) so as to facilitate maintenance and examination (see FIG. 2).

(Housing in Housing)

Figure 10:
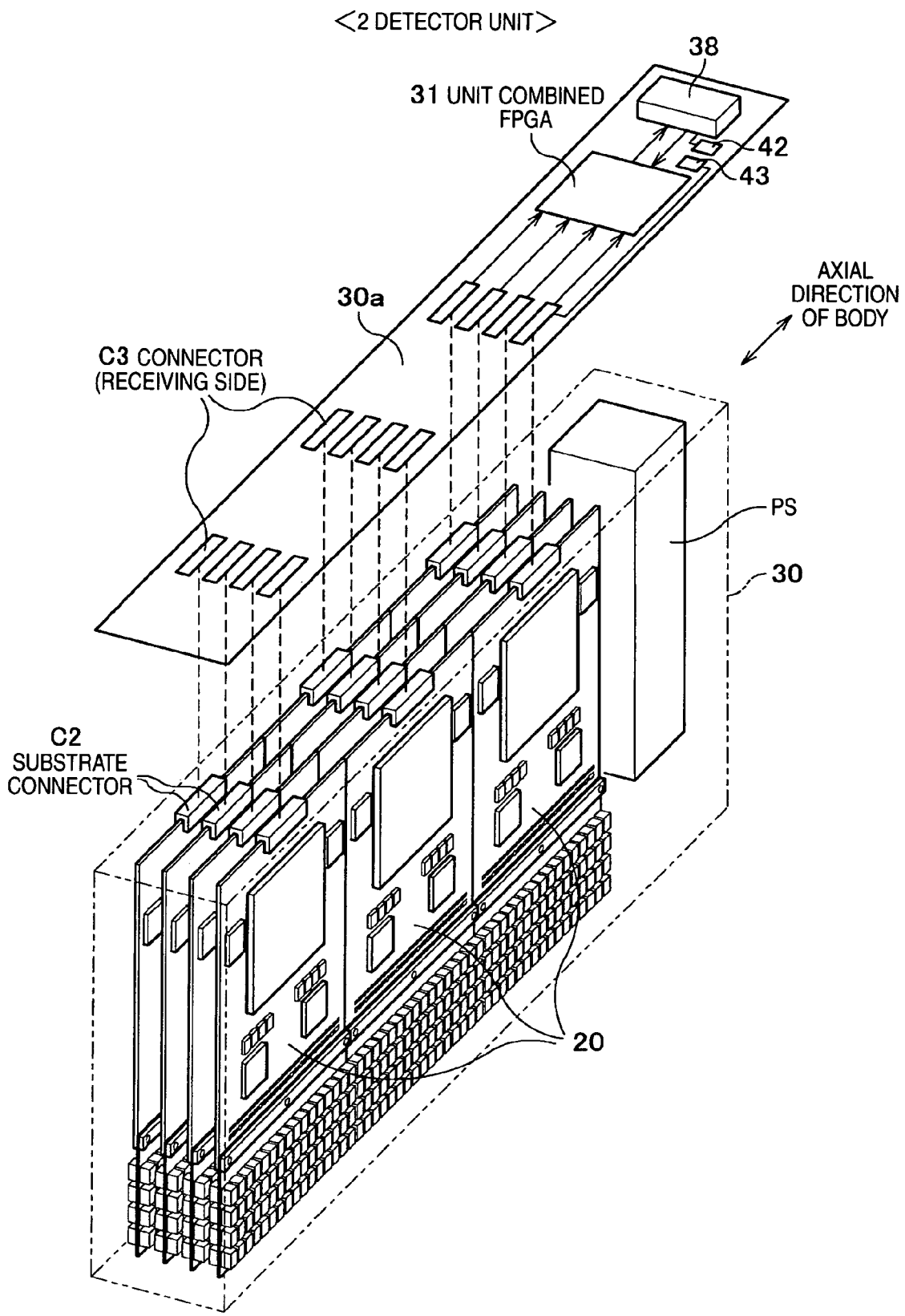
FIG. 10 is a perspective view quoted to illustrate a construction of a detector unit housing a plurality of semiconductor radiation detectors.

As shown in FIG. 10, the detector unit 2 is provided with a housing 30, etc., for housing or holding the above described 12 combined substrates 20, a high-voltage power supply PS for supplying a charge collecting voltage to these 12 combined substrates 20, the above described FPGA 31, signal connectors for exchanging signals with the outside and power connectors for receiving a power supply from the outside.

Figure 11:
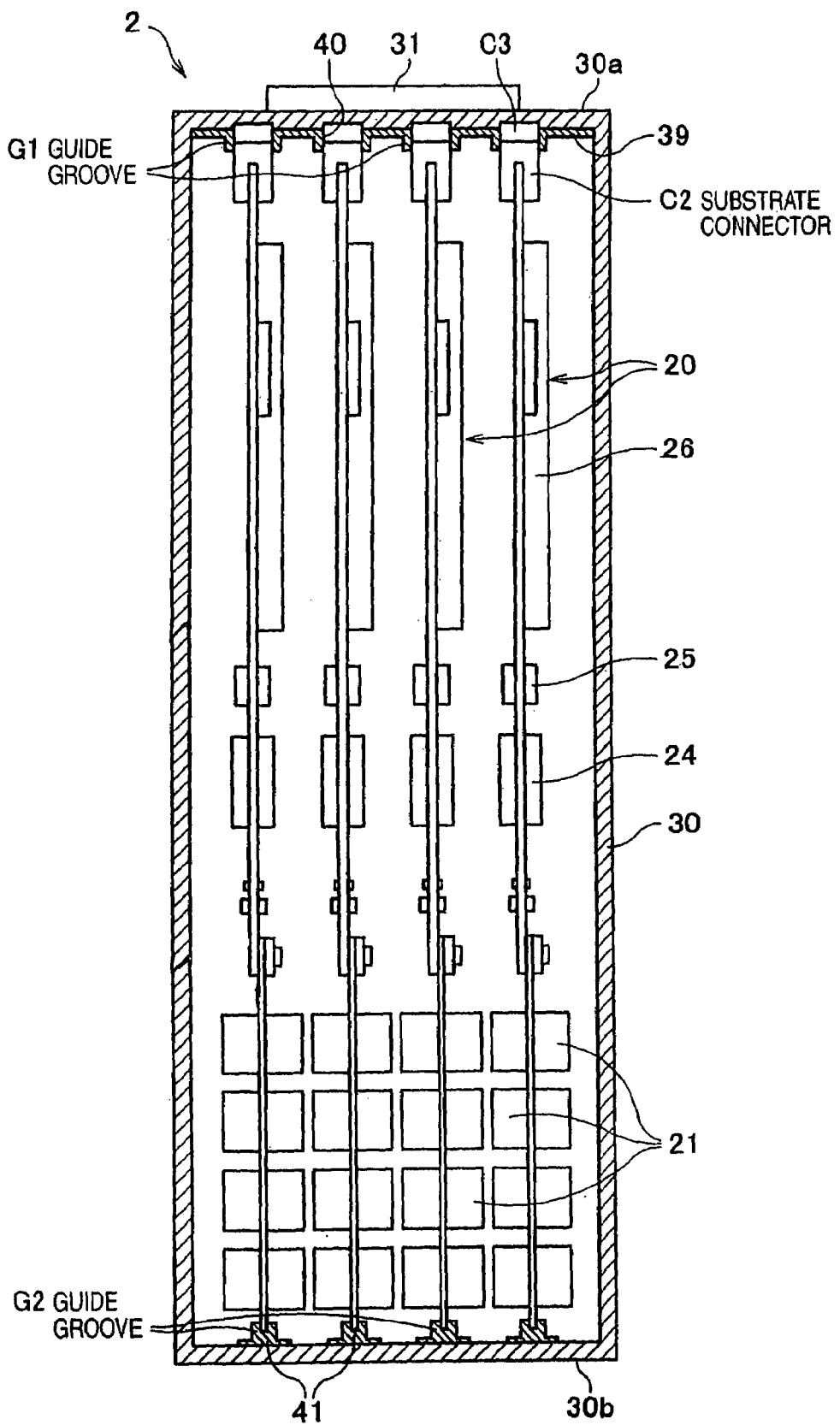
FIG. 11 is a side view of the detector unit in FIG. 10 without the side plate.

As shown in FIG. 10 and FIG. 11, the combined substrates 20 are housed in the housing 30, arranged in three rows in the depth direction (longitudinal direction of the bed 14) without overlapping with one another and in four rows in the width direction (circumferential direction of the camera 11). Namely, one housing 30 houses twelve combined substrates 20. To realize such housing, a guide member 39 consisting of four rows of guide grooves (guide rails) G1 extending in the depth direction and arranged at appropriate intervals in the circumferential direction is disposed in the housing 30 and fitted at the upper end of the housing (cover) 30. The guide member 39 has an opening 40 opposed to each connector C3 of a ceiling plate 30a in the portion of each guide groove G1. Furthermore, a bottom plate 30b of the housing 30 is provided with four guide members 41 having one guide groove (guide rail) G2 extending in the depth direction arranged at appropriate intervals in the circumferential direction (see FIG. 11). The guide grooves G1, G2 have a depth corresponding to a capacity of housing three combined substrates 20. An end of the combined substrate 20 on the ASIC substrate 20B side is housed in the guide groove G1 and an end of the combined substrate 20 on the detector substrate 20A side is housed in the guide groove G2. Three combined substrates 20 are held in the depth direction of the guide grooves G1, G2. Note that since the end of the combined substrate 20 on the ASIC substrate 20B side and the other end on the detector substrate 20A side are designed to be slidable in the guide grooves G1, G2, it is possible to easily position the combined substrates 20 at predetermined locations by sliding them in the guide grooves G1, G2 with fingers, for example. In this case, each substrate connector C2 is positioned in the portion of each opening 40. After a predetermined number of combined substrates 20 are arranged in the housing 30, the ceiling plate 30a is attached at the top end of the housing 30 in a detachable/attachable manner using screws, etc. Each connector C3 fitted in the ceiling plate 30a is inserted in the corresponding opening 40 and connected to the corresponding substrate connector C2. The terms "upper" and "lower" sections of the housing 30 are applicable when the housing 30 is removed from the camera 11, and when the housing 30 is mounted in the camera 11 as shown in FIG. 2, the upper and lower sections may be inverted or turned 90 degrees to be "right" and "left" sections or located diagonally.

As shown in FIG. 11, the ceiling plate 30a of the housing 30 is provided with not only the four rows of guide grooves G1 but also FPGA 31 and connector 38. The connector 38 is connected to the FPGA 31. The FPGA 31 is programmable in the field. In this aspect, the FPGA 31 is different from the ASIC in that it is not programmable. Therefore, as with this embodiment, even if the number or type of the combined substrates 20 to be housed changes, the FPGA 31 can be programmed in the field to be adaptable to changes in the number of substrates appropriately.

Since the detectors 21 using CdTe as the semiconductor material S in this embodiment generate charge in reaction with light, the housing 30 is made of a material having light shielding properties such as aluminum and an alloy of aluminum and designed in such a way as to eliminate gaps through which light enter. That is, the housing 30 is constructed to secure light shielding properties. If, for example, light shielding properties are secured by other means, the housing 30 itself need not be provided with light shielding properties and the housing 30 can be a frame (framework) to hold the detectors 21 in a detachable/attachable manner (e.g., no light shielding plane member (panel), etc., is required).

Figure 12A:
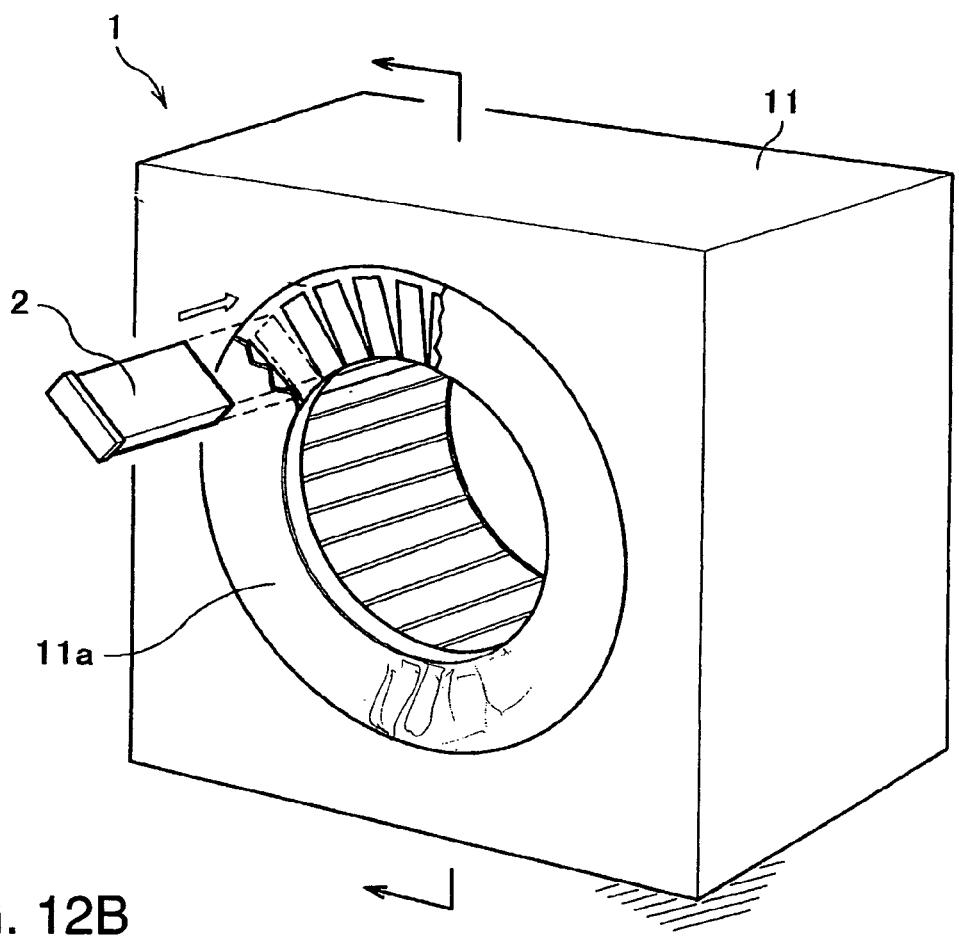
FIG. 12A is a partially exploded perspective view of a camera when the detector unit is mounted on the camera and FIG. 12B is a cross-sectional view of the central part of the camera.
Figure 12B:
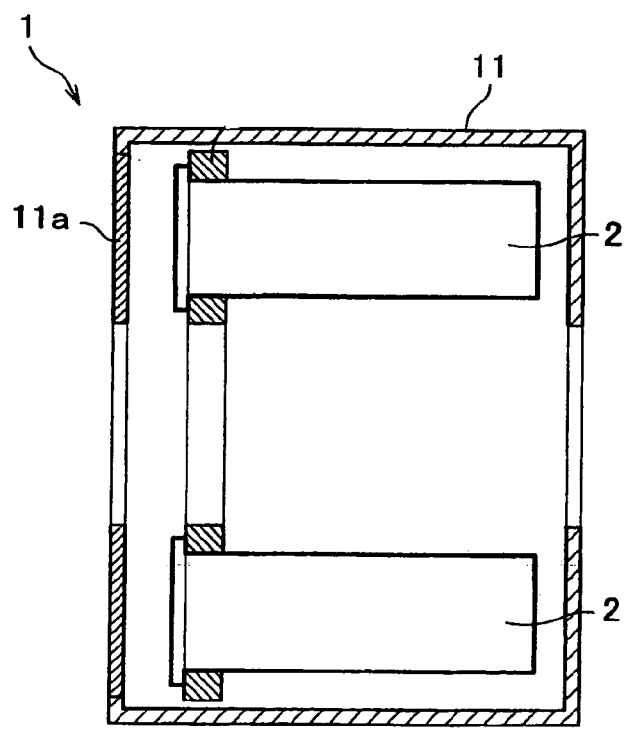

As shown in FIG. 12A, the detector unit 2 is mounted via a unit support member. Furthermore, as shown in FIG. 12B, the detector unit 2 is mounted in the camera 11 with one end supported by the unit support member. The unit support member has a hollow disk (doughnut) shape and is provided with many windows (as many as the detector units 2 to be mounted) in the circumferential direction of the camera 11. In order to support the detector units 2 at one end, a flange portion serving as a stopper is provided on the front side in the axial direction of the body of the housing 30 of the detector unit 2. Note that the flange portions inside in the circumferential direciton become obtrusive when the detector units 2 are arranged as dense as possible in the circumferential direction. Therefore, kit is possible to remove the obtrusive flange portions from the housing 30 and allow the flange portions outside in the circumferential direction to remain. Or it is also possible to provide another unit support member and support both ends of the detector unit 2 by the two unit support members.

In order to mount the detector units 2 in the unit support member, this embodiment allows many detectors 21 to be mounted in the camera 11 at a time. This can considerably shorten the time of mounting the detectors 21 in the camera 11. Furthermore, packet data (all packet data for all detectors 21 of a combined substrate 20) output from the data transfer apparatus 38 of all the combined substrates 20 in the detection unit 2 is sent from the unit combination FPGA 31 provided in the detection unit 2 to the data processing apparatus 12. In this way, the number of wires through which packet data is transmitted to the data processing apparatus 12 in this embodiment is also significantly reduced compared to the case where packet data is sent from each data transfer apparatus 38 of the combined structure 20 to the data processing apparatus 12.

When the detector units 2 is mounted in the camera 11, a cover 11a is removed to make the unit support member exposed so that the detector units 2 are inserted until the detector units 2 touch the flange portinos. When the detector units 2 are inserted and fitted, connections between the camera 11 and the detector units 2 are made, and signals and power supply are connected between the camera 11 and the detector units 2.

(Power Supply)

Then, the high-voltage power supply apparatus PS for supplying a charge collection voltage will be explained. As shown in FIG. 10, the detector unit 2 provides the high-voltage power supply apparatus PS for supplying a charge collection voltage to each detector 21 in a space formed inside the housing 30 on the back of the FPGA 31. This high-voltage power supply apparatus PS receives a low voltage power supply, boosts the voltage to 300 V using a DC-DC converter (means for boosting the voltage, which is not shown) and supplies the voltage to each detector 21. 64 detectors 21 are provided per one combined substrate 20 (=detector substrate 20A) on one side, and 128 on both sides. Twelve such combined substrates 20 are housed in one housing 30 (that is, one detector unit 2). Thus, the high-voltage power supply apparatus PS supplies voltages to 128×12=1536 detectors 21.

Conventionally, a supply voltage of 300 V with extremely small fluctuations is supplied from a precision power supply apparatus in a remote place, but since (1) when the distance from the precision power supply apparatus increases, a wider insulating structure for high voltage wiring is required (the insulating distance increases) and (2) the voltage fluctuates due to a temperature variation of the detectors 21, there is a problem that supplying a precise voltage from the precision power supply apparatus does not necessarily result in a precise voltage in the part of the target detectors 21.

Furthermore, to facilitate maintenance and examination, it is also possible to consider providing the detector unit 2 according to this embodiment with a power connector (not shown) and removing a high-voltage power line extending from the precision power supply apparatus at this power connector. That is, according to this embodiment, it is possible to consider supplying a high-voltage power supply to the detector units 2 from outside the units 2 via power connectors. However, in the case of a high voltage of 300 V, this results in a problem that the size of the power connector increases in addition to the above described problem of insulation.

According to this embodiment, the high-voltage power supply apparatus PS built in the detector unit 2 is connected to an external low voltage (5 to 15 V) DC power supply through the power connector 42 and connector 38 provided on the ceiling plate 30a via power wiring. A high-voltage terminal of the high-voltage power supply apparatus PS is connected to twelve connectors C3 provided on the ceiling plate 30a through the connector 43 provided on the ceiling plate 30a and connected to electrodes C of the respective detectors 21 provided on the substrate body 20a through the connector C2 of the respective combined substrates 20, power wiring (not shown) in the substrate body 20b, connector C1 and power wiring (not shown) in the substrate body 20a. The connectors C1, C2 include not only connectors for transmitting output signals of the detectors 21 but also connectors for power wiring. Since the high-voltage power supply apparatus PS boosts a low voltage applied from the power supply to 300 V using a DC-DC converter, it is possible to reduce the high-voltage section and thereby shorten the insulation distance. That is, this eliminates the necessity for using high-voltage wiring for a portion from the connector 42 to the DC power supply. It also facilitates maintenance, etc. For the problem with voltage fluctuations, this embodiment provides not the high-precision power supply apparatus but the high-voltage power supply apparatus PS having accuracy according to a temperature fluctuation of the voltage. This eliminates the necessity for a high-precision power supply. Furthermore, since it is a low voltage that is received from an external power supply, it is possible to use a small power connector to be provided for the connector 38. Using the small power connector increases the degree of freedom in the layout. Furthermore, since the high-voltage power supply apparatus PS is arranged in a space formed in the housing 30 on the back side of the FPGA 31, the arrangement of the high-voltage power supply apparatus PS in the housing 30 makes the detector unit 2 more compact instead of upsizing. It is also possible to directly connect the high-voltage power supply apparatus PS to the power wiring provided on the substrate body 20a through the connector, without the ceiling plate 30a. Furthermore, the power connector can also be separated from the output signal connector of the detector 21. This prevents noise from entering the signal wiring from the power supply system.

Furthermore, by reducing a supply voltage to the detector unit 2, it is possible to supply power to the high-voltage power supply apparatus PS at a low voltage through the unit combination FPGA 31 as with power supplies to the ASICs 24, 26.

Furthermore, supplying power using the high-voltage power supply apparatus PS eliminates the necessity for insulation from the housing (GND).

The voltage supplied from the FPGA 31 to the high-voltage power supply apparatus PS is boosted to 300 V by a DC-DC converter (not shown) in the high-voltage power supply apparatus PS and after boosting, passed through the ceiling plate 30a of the housing 30 and supplied from ASIC substrate 20B→detector substrate 20A→each detector 21 for each combined substrate 20. That is, the housing 30 (ceiling plate 30a) is provided with wiring for voltage supply (not shown) for supplying a voltage from the high-voltage power supply apparatus PS to each combined substrate 20. Furthermore, each combined substrate 20 is provided with wiring for voltage supply which supplies a voltage supplied from the high-voltage power supply apparatus PS to each detector 21 via the substrate connector C2.

Embodiment 2

A nuclear medicine diagnostic apparatus according to another embodiment will be explained. The nuclear medicine diagnostic apparatus of this embodiment is single photon emission computer tomography (SPECT) apparatus.

This SPECT apparatus 51 will be explained using FIGS. 13 to 15. The SPECT apparatus 51 is provided with a pair of radiation detection blocks 52, a rotary holder (body of rotation) 57, a data processing apparatus 12 and a display apparatus 13. The radiation detection blocks 52 are disposed at two positions with a 180° difference in the circumferential direction of the rotary holder 57. More specifically, the respective unit support members 56 of the radiation detection blocks 52 are mounted on the rotary holder 57 with a 180° difference in the circumferential direction. A plurality of detector units 2A each including twelve combined substrates 53 are mounted on the respective unit support members 56 in a detachable/attachable manner. Thus, the detectors 21 are supported by the unit support member. The construction of each detector unit 2A is the same as that of the detector unit 2 according to Embodiment 1 except the construction of the combined substrate 53.

Figure 14:
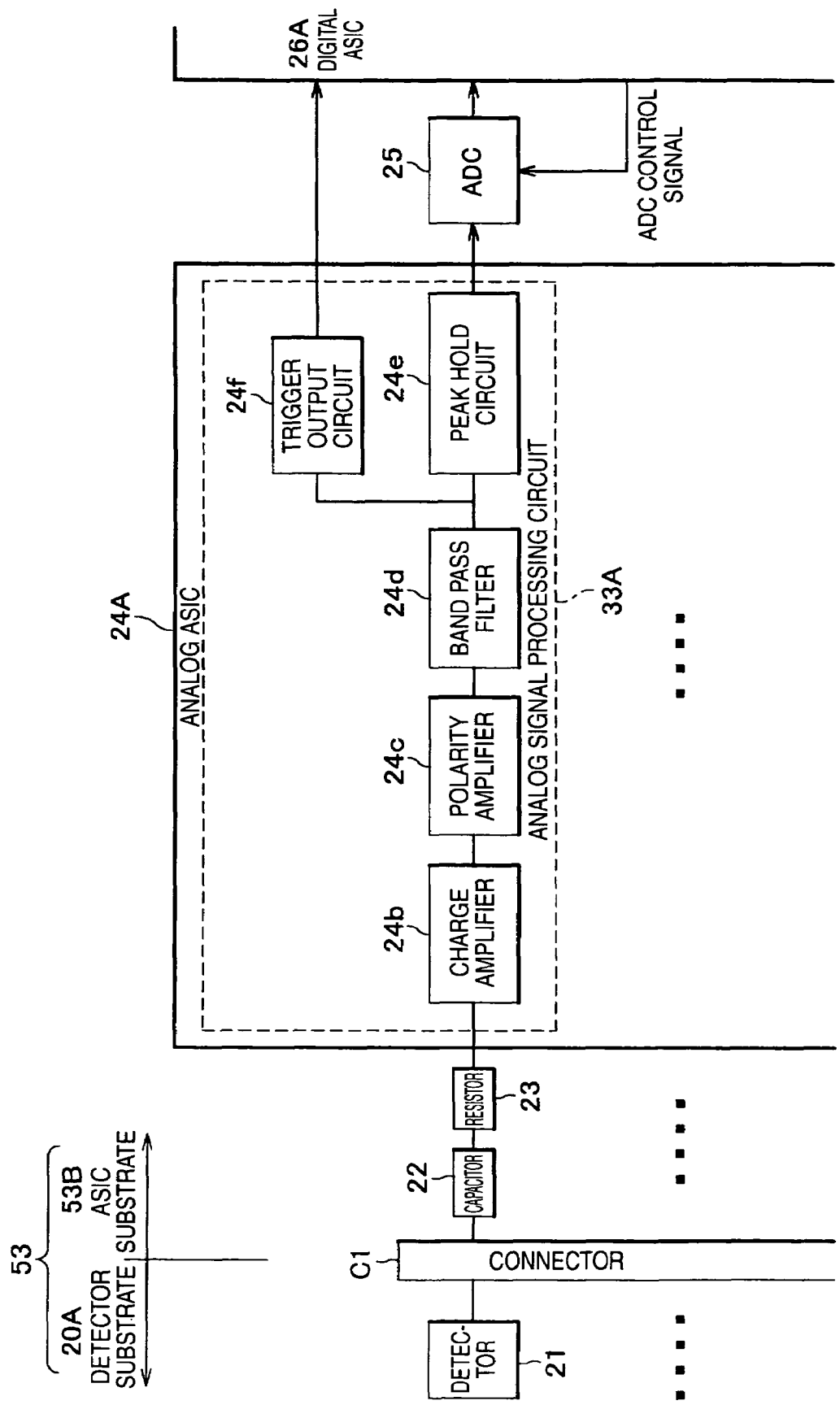
FIG. 14 is a block diagram schematically showing a circuit construction of an analog ASIC of the SPECT apparatus in FIG. 13.
Figure 15:
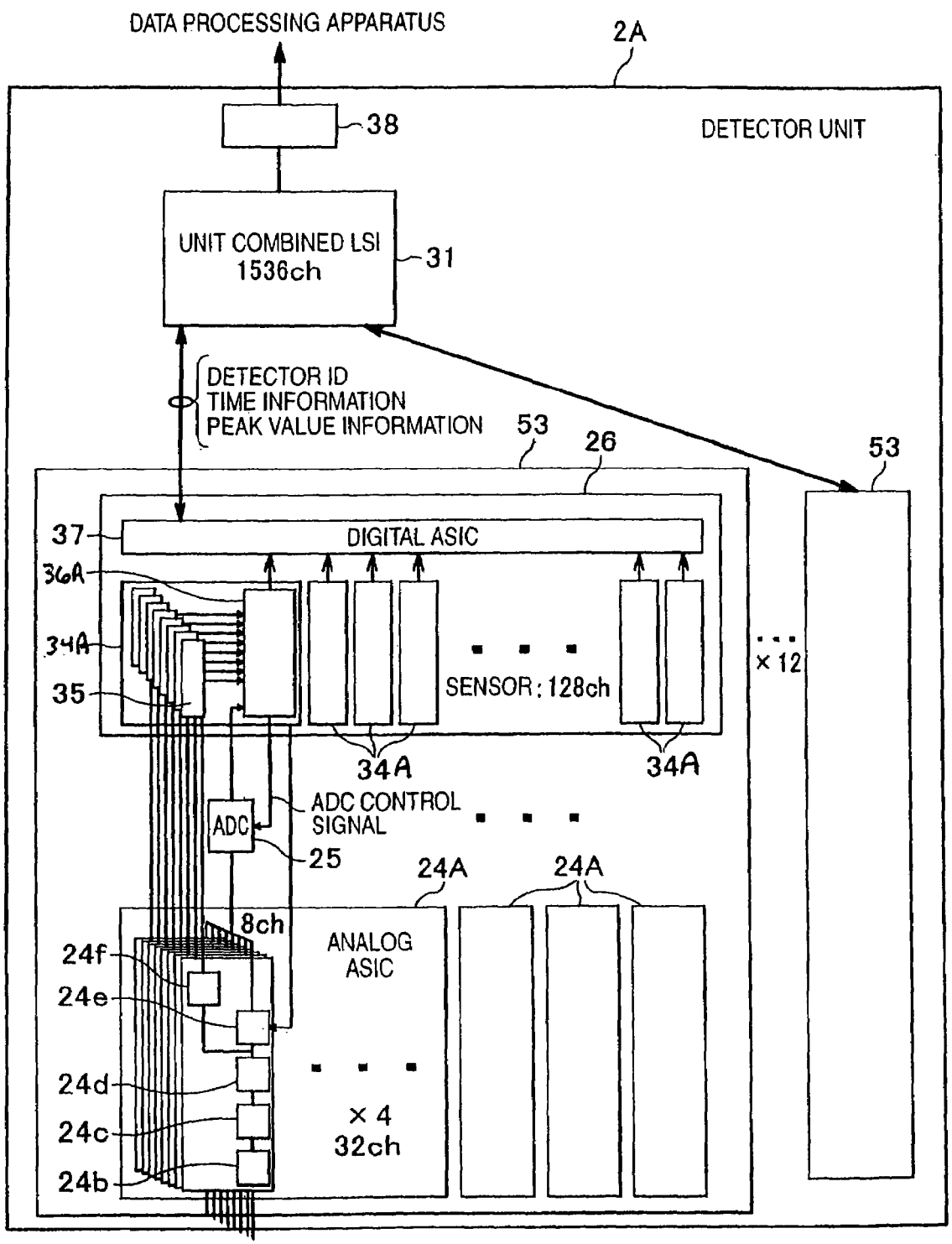
FIG. 15 is a block diagram showing a schematic construction of a digital ASIC in the SPECT apparatus in FIG. 13 and a connection relationship between the analog ASIC and digital ASIC.

The combined substrate 53 includes a detector substrate 20A and an ASIC substrate 53B as with the above described combined substrate 20 (FIG. 14). The detectors 21 at one end of each detector substrate 20A are arranged facing the bed 14. A collimator 55 made of a radiation shielding member (e.g., lead, tungsten, etc.) is provided on each radiation detection block 52. Each collimator 55 forms many radiation passages through which radiation (e.g., γ-rays) passes. These radiation passages are provided in a one-to-one correspondence with the detectors 21 positioned at one end of all the detector substrates 20A of one radiation detection block 52. All the combined substrates 53 and collimators 55 are arranged within a light/electromagnetic shield 54 mounted on the rotary holder 57. The collimator 55 is mounted in the light/electromagnetic shield 54. The light/electromagnetic shield 54 cuts off influences of electromagnetic waves other than γ-rays on the detectors 21, etc.

When the bed 14 on which an examinee administered with radiopharmaceuticals is laid is moved, the examinee is moved between the pair of radiation detection blocks 52. When the rotary holder 57 is rotated, the detector units 2A of each radiation detection block 52 revolve around the examinee. γ-rays emitted form an area in the body of the examinee where radiopharmaceuticals are concentrated (e.g., affected area) C pass through the radiation passages of the collimator 55 and are introduced into the corresponding detectors 21. The detectors 21 output γ-rays detection signals. These γ-ray detection signals are processed by analog ASIC 24A and digital ASIC 26A, which will be described later.

The construction of the detector substrate 20A used in this embodiment (Embodiment 2) is the same as that in Embodiment 1 and therefore the explanations will be omitted in this embodiment. The ASIC substrate 53B making up the combined substrate 53 will be explained using FIGS. 14 and 15. As with the combined substrate 20, the ASIC substrate 53B connected to the detector substrate 20A through the connector C1 includes a capacitor 22 and a resistor 23, four analog ASICs 24A and one digital ASIC 26A for each detector 21.

One analog ASIC 24A is provided with 32 sets of analog signal processing circuits (analog signal processing apparatuses) 33A having a slow system and fast system. One analog signal processing circuit 33A is provided for each detector 21. Here, the fast system includes a trigger output circuit 24f which outputs a trigger signal for specifying detection of γ-rays. As with the analog ASIC 24, the slow system is provided with a charge amplifier 24b, a polarity amplifier 24c, a band pass filter 24d and a peak hold circuit 24e connected in this order. One analog ASIC 24A integrates 32 sets of analog signal processing circuits 33A into one LSI. A γ-ray detection signal which is output from the detector 21 and has passed through the capacitor 22 and resistor 23 are guided through the charge amplifier 24b, polarity amplifier 24c and band pass filter 24d and input to the peak hold circuit 24e. The peak hold circuit 24e holds a peak value of the γ-ray detection signal. The γ-ray detection signal output from the band pass filter 24d is input to the trigger output circuit 24f. The trigger output circuit 24f outputs a trigger signal when a γ-ray detection signal at a set level or higher is input to remove influences of noise.

The digital ASIC 26A includes a packet data generation apparatus 34A and a data transfer circuit 37 and integrates them into one LSI. The above described trigger signal is input to the ADC control circuit 36A of the packet data generation apparatus 34A. All the digital ASICs 26A provided on the SPECT apparatus 51 receive a 64 MHz clock signal from a clock generation apparatus (crystal oscillator) (not shown) and operate synchronously. The clock signal input to each digital ASIC 26A is input to the respective ADC control circuits 36A in all the packet data generation apparatuses 34A. The ADC control circuit 36A identifies the detector ID when the trigger signal is input. That is, the ADC control circuit 36A stores a detector ID for each trigger output circuit 24f connected to the ADC control circuit 36A and can identify, when a trigger signal is input from a certain trigger output circuit 24f, the detector ID corresponding to the trigger output circuit 24f. The ADC control circuit 36A outputs an ADC control signal including the detector ID information to the ADC 25. The ADC 25 converts the peak value information output from the peak hold circuit 24e of the analog signal processing circuit 33A corresponding to the detector ID to a digital signal and outputs it. This peak value information is input to the ADC control circuit 36. The ADC control circuit 36A adds the peak value information to the detector ID to generate packet data. The packet data (including detector ID and peak value information) which is the digital information output from the ADC control circuit 36A of each packet data generation apparatus 34A is input to the data transfer circuit 37. The data transfer circuit 37 sends the packet data output from each ADC control circuit 36A to the unit combination FPGA 31 of the detector unit 2A periodically. The unit combination FPGA 31 outputs the digital information to the information transmission wiring connected to the connector 38.

Packet data output from the unit combination FPGA 31 is sent to the data processing apparatus 12. A rotation angle detected by an angle gauge (not shown) connected to the rotation shaft of a motor (not shown) for rotating the rotary holder 57 is input to the data processing apparatus. This rotation angle indicates the rotation angle of each radiation detection block 52 and more specifically indicates the rotation angle of each detector 21. Based on this rotation angle, the data processing apparatus 12 determines the position (position coordinates) of each revolving detector 21 on the revolving orbit. In this way, the position (position coordinates) of the detector 21 when γ-rays are detected is calculated. Based on the calculated position of the detector 21, the data processing apparatus 12 counts γ-rays whose peak value information reaches and exceeds a set value. This counting is performed on each area obtained by dividing the revolving circle into 0.5° portions relative to the rotational center of the rotary holder 57. The peak value information is an accumulated value of peak values of respective γ-ray detection signals of a plurality of detectors 21 (four detectors 21 arranged on a straight line in FIG. 7A) positioned on an extension of the radiation passage of the collimator 55. Using the position information of the detectors 21 and count value (count information) of γ-rays when γ-rays are detected, the data processing apparatus 12 creates tomographic information on a position at which radiopharmaceuticals are concentrated, that is, position of malignant tumor of the examinee. This tomographic information is displayed on the display apparatus 13. Information such as the above described packet information, count value obtained by simultaneous measurement, position information of the detector 21 and tomographic information are stored in the storage apparatus of the data processing apparatus 12.

The foregoing embodiments have described the PET apparatus 1 and SPECT apparatus 51, but the present invention is also applicable to a γ camera. Functional images obtained from the γ camera are two-dimensional and the γ camera is provided with a collimator for regulating angles of incidence of γ-rays. Moreover, it is also possible to adopt a construction of a nuclear medicine diagnostic apparatus combining the PET apparatus 1 and SPECT apparatus 51, and an X-ray CT.

Mounting (housing) of the detector unit 2 in the camera 11 is not limited to the mounting using the above-described unit support member, but any mounting/housing means or method can be used.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A positron emission tomography apparatus comprising:
a bed for supporting an object to be examined; and
a plurality of substrates, each including a first surface and a second surface, said first surface of a substrate facing said second surface of another substrate, and on both surfaces of said substrate, a plurality of semiconductor radiation detectors to which radiation is input and an analog integrated circuit for processing radiation detection signals output from each of said plurality of semiconductor radiation detectors, and an AD converter for converting an analog signal output from said analog integrated circuit to a digital signal for input to a digital integrated circuit on said first surface of said substrate, and the digital integrated circuit to which said digital signal is input and which is arranged faces the second surface on which no digital integrated circuit is arranged,
wherein said substrates are arranged in a direction perpendicular to a longitudinal direction of said bed, and in the substrates, said plurality of semiconductor radiation detectors are arranged near said bed, and said digital integrated circuit is located far from said bed.

2. The positron emission tomography apparatus according to claim 1, further comprising a tomographic information creation apparatus which creates tomographic information using second information obtained based on first information output from said digital integrated circuit.

3. The positron emission tomography apparatus according to claim 2, wherein said substrate is a unit substrate comprising a first substrate and a second substrate,
said first substrate comprises said semiconductor radiation detectors, and
said second substrate comprises said digital integrated circuit.

4. The positron emission tomography apparatus according to claim 1, further comprising:
a counting apparatus to which first information from said digital integrated circuit is input, the counting apparatus counts in pairs said first information corresponding to a pair of said radiation detection signals detected within a set time; and
a tomographic information creation apparatus for creating tomographic information using count information output from said counting apparatus.

5. The positron emission tomography apparatus according to claim 1, wherein said analog integrated circuit comprises a plurality of signal processing apparatuses each of which is provided to each of said semiconductor radiation detectors, and said digital integrated circuit comprises an AD conversion control apparatus for outputting a control signal including information to specify said semiconductor radiation detectors to said AD converter according to signals previously input from said signal processing apparatuses, and said AD converter which is provided to said plurality of signal processing apparatuses converts an analog signal output from a signal processing apparatus corresponding to a control signal input from said AD conversion control apparatus to a digital signal and outputs said digital signal to said digital integrated circuit.

6. The positron emission tomography apparatus according to claim 5, wherein said semiconductor radiation detectors, said analog integrated circuit, said AD converter and said digital integrated circuit are arranged in that order from one end to the other end of said substrate in the direction perpendicular to said longitudinal direction of said substrate.

7. The positron emission tomography apparatus according to claim 5, wherein said analog integrated circuit is provided with a function of amplifying signals and said digital integrated circuit is provided with a function of deciding radiation detection times.

8. The positron emission tomography apparatus according to claim 5,
wherein said substrate is a unit substrate comprising a first substrate and a second substrate,
said first substrate comprises said semiconductor radiation detectors and said analog integrated circuit, and
said second substrate comprises said digital integrated circuit.

9. The positron emission tomography apparatus according to claim 5,
wherein said substrate is a unit substrate comprising a first substrate, a second substrate and a third substrate,
said first substrate comprises semiconductor radiation detectors,
said second substrate comprises said analog integrated circuit, and
said third substrate comprises said digital integrated circuit.

10. The positron emission tomography apparatus according to claim 9, wherein said first substrate and said second substrate are connected in a mutually detachable/attachable manner.

11. The positron emission tomography apparatus according to claim 9, wherein said second substrate and said third substrate are connected in a mutually detachable/attachable manner.

12. The positron emission tomography apparatus according to claim 9, wherein said first substrate and said second substrate are connected in such a way that ends of both substrates are overlapped with each other.

13. The positron emission tomography apparatus according to claim 1, wherein said plurality of substrates are arranged in such a way as to surround said bed.

14. A positron emission tomography apparatus according to claim 1, wherein signals from said analog integrated circuits arranged on both surfaces of said substrate are input to said digital integrated circuit on only one surface of said substrate.

15. A positron emission tomography apparatus comprising:
a bed for laying an object to be examined; and
a plurality of substrates, each including a first surface and a second surface, said first surface of a substrate facing said second surface of another substrate, and on both surfaces of said substrate, a plurality of semiconductor radiation detectors to which radiation is input, and an analog integrated circuit for processing radiation detection signals output from each of said plurality of semiconductor radiation detectors, and an AD converter for converting an analog signal output from said analog integrated circuit to a digital signal for input to a digital integrated circuit on said first surface of said substrate, and the digital integrated circuit to which said digital signal is input and which is arranged faces the second surface on which no digital integrated circuit is arranged,
wherein said substrates are arranged in a direction perpendicular to a longitudinal direction of said bed, and in the substrates, said plurality of semiconductor radiation detectors are arranged near said bed, and said digital integrated circuit is located far from said bed, and plural ones of said semiconductor radiation detectors are arranged in said direction perpendicular to said longitudinal direction of said bed.

16. A positron emission tomography apparatus comprising:
a bed for laying an object to be examined; and
a plurality of substrates, each including a first surface and a second surface, said first surface of a substrate facing said second surface of another substrate, and on said first surface of said substrate, a plurality of semiconductor radiation detectors to which radiation is input, and an analog integrated circuit for processing radiation detection signals output from each of said plurality of semiconductor radiation detectors, and an AD converter for converting an analog signal output from said analog integrated circuit to a digital signal for input to a digital integrated circuit on only one surface of said substrate, and the digital integrated circuit to which said digital signal is input and which is arranged faces the second surface on which no digital integrated circuit is arranged,
wherein said substrates are arranged in a direction perpendicular to a longitudinal direction of said bed, and in the substrates, said plurality of semiconductor radiation detectors are arranged near said bed, and said digital integrated circuit is located far from said bed, and said semiconductor radiation detectors include CdTe, TlBr or GaAs.

17. A positron emission tomography apparatus comprising:
a bed for laying an object to be examined; and
a plurality of substrates, each including a first surface and a second surface, said first surface of a substrate facing said second surface of another substrate, and on both surfaces of said substrate, a plurality of semiconductor radiation detectors to which radiation is input, and on said first surface of said substrate, a digital integrated circuit for processing radiation detection signals output from each of said plurality of semiconductor radiation detectors arranged on both surfaces of said substrate and the digital integrated circuit is arranged faces the second surface on which no digital integrated circuit is arranged.

* * * * *